United States Patent [19]
Shimizu et al.

[11] Patent Number: 6,115,472
[45] Date of Patent: Sep. 5, 2000

[54] CONTENTS TRANSMISSION CONTROL METHOD WITH USER AUTHENTICATION FUNCTIONS AND RECORDING MEDIUM WITH THE METHOD RECORDED THEREON

[75] Inventors: Akihiro Shimizu; Tsutomu Horioka; Hiroshi Hamada, all of Yokohama, Japan

[73] Assignee: Nippon Telegraph and Telephone Corporation, Tokyo, Japan

[21] Appl. No.: 08/926,042

[22] Filed: Sep. 9, 1997

[30] Foreign Application Priority Data

Sep. 11, 1996 [JP] Japan ................................. 8-240190

[51] Int. Cl.$^7$ ........................................................ H04L 9/00
[52] U.S. Cl. ......................... 380/262; 713/155; 713/174
[58] Field of Search ................................ 380/25, 48, 23, 380/49; 713/200, 201, 202

[56] References Cited

U.S. PATENT DOCUMENTS

| | | |
|---|---|---|
| 5,239,294 | 8/1993 | Flanders et al. . |
| 5,506,905 | 4/1996 | Markowski et al. . |
| 5,604,803 | 2/1997 | Aziz ........................................... 380/25 |
| 5,721,779 | 2/1998 | Funk ........................................... 380/23 |
| 5,794,221 | 8/1998 | Egendorf ..................................... 705/40 |

FOREIGN PATENT DOCUMENTS

WO 96/13920  5/1996  WIPO .

OTHER PUBLICATIONS

Leslie Lamport, "Password Authentication with Insecure Communication," *Communications of the ACM*, vol. 24, No. 11, Nov. 1981, pp. 770–772.

Akihiro Shimizu, "A Dynamic Password Authentication Method Using a One–Way Function," *Systems and Computers in Japan*, vol. 22, No. 7, 1991, New York, pp. 32–40.

*Primary Examiner*—Gail O. Hayes
*Assistant Examiner*—Ho S. Song
*Attorney, Agent, or Firm*—Pollock, Vande Sande & Amernick

[57] ABSTRACT

A user sets n=0, his mail account A and password S, then computes $V_0=E(A,S)$, $W_0=E(A,V_0)$, $V_1=E(A,A\oplus 1)$, $W_1=E(A,V_1)$ and $M_0=E(W_1, V_0)$, and initially registers $W_0$, $W_1$, $M_0$ and A by e-mail in a mail server. At a visiting site the user sends a service request and A to the mail server form an arbitrary terminal connected to the Internet, and the mail server reads out the authentication session number n corresponding to the identifier A and sends it back to the user. The user computes $V_{n-1}=E(A,S\oplus(n-1))$, $V_{n+1}=E(A,S\oplus(n+1))$, $W_{n+1}=E(A,V_{n+1})$. $V_n=E(A,S\oplus n)$ and $M_n=E(W_{n+1}, V_n)$ and sends $V_{n-1}$, $W_{n+1}$ and $M_n$ to the mail server. The mail server computes $E(A,V_{n-1})$ and $E(W_n, V_{n-1})$ and if they agree with preregistered $W_{n-1}$ and $M_{n-1}$, respectively, the mail server accepts the user as valid and sends a mail message of the user.

20 Claims, 11 Drawing Sheets

CONTENTS TRANSMISSION CONTROL METHOD WITH USER AUTHENTICATION FUNCTIONS AND RECORDING MEDIUM WITH THE METHOD RECORDED THEREON

BACKGROUND OF THE INVENTION

The present invention relates to a contents transmission control method (protocol) that permits fast password-based authentications using small-scale programs to realize secure contents transmission in the Internet, which is vulnerable to wiretap and hence does not provide adequate security of information. The invention also pertains to a recording medium with the method recorded thereon.

As Internet penetration increases, it becomes indispensable to authenticate the capacity of communication partners or users in communications. To meet this requirement, there have been proposed a wide variety of authentication methods, which fall roughly into the categories of those using public-key cryptosystems and those using common-key cryptosystems.

The method employing the public-key cryptosystem has, an excellent authentication ability and is expected to be applied to electronic transactions or the like. However, because of a long execution time and a large program size, the area of its application is limited in integration into a terminal of poor processing ability, such as a PDA (Personal Digital Assistant: a portable terminal) and communication protocols related to the Internet.

As a solution to this problem, it is customary in the art to use a method that utilizes the common-key cryptosystem capable of far faster processing than the public-key cryptosystem, but a password-based authentication method is particularly popular for application to the above-mentioned areas.

The basic password authentication procedure is as follows:

First, the prover registers his password with the verifier. At the authentication time, the prover transmits his password to the verifier. The verifier compares the received password with the registered one.

This method has such problems as listed below.

(a) The password may be stolen by visual access to the password file.

(b) The password may be stolen by a wiretap on the communication line.

(c) The prover is required disclose secret information, i.e., the password, to the verifier.

One possible method that has been proposed to solve problem (a) is a method according to which the prover applies a one-way function to his password and preregisters it with the verifier, and at authentication time the verifier applies the same one-way function to his received password and compares it with the preregistered password (A. Evans, W. Kantrowitz and E. Weiss, "A user authentication scheme not requiring secrecy in the computer," Commun. ACM, 17, 8, pp. 437–442 (1974) and R. Morris and K. Thompson, "Password security: A case history," UNIX Programmer's Manual, Seventh Edition, 2B (1979)).

The one-way function is a function for which there is no efficient means for recovering its input from its output except by checking inputs one by one; if the computational complexity for testing all the inputs involved is chosen to be exorbitantly large, it would be possible to exclude the possibility that an unauthorized person might compute the prover's input data and impersonate the prover. In general, one-way functions are obtainable by secret-key cryptosystems such as DES, FEAL and so forth. The secret-key cryptosystems apply a secret key to the input plaintext to obtain a ciphertext as the output; the secret key cannot be computed from the plaintext and the ciphertext. That is, the secret-key cryptosystems are designed such that the secret key cannot efficiently be obtained except by testing all the secret keys individually. Thus, by inputting the plaintext, a given parameter and a secret key to obtain the output ciphertext through the use of this scheme, a one-way function can be realized which is dependent on the robustness of the secret-key cryptosystem. Furthermore, the secret-key cryptosystems such as DES and FEAL have a feature that even if the plaintext or secret key input varies by one bit, the output can be obtained without the slightest trace of input variation.

As described above, the problem (a) of the basic password authentication method can be solved by the method using the one-way function. When applied to the Internet, which is vulnerable to wiretap, however, this method cannot fix problem (b). Moreover, as pointed out above concerning problem (c), this basic password authentication method is applicable to the authentication of bank customers but is not suitable for the authentication of users of the same level.

To correct such problems, there have been proposed a Lamport method (L.Lamport, "Password authentication with insecure communication," Commun. ACM, 24, 11, pp. 770–772 (1981)) and a CINON method (Chained One-Way Data Verification Method) that is a dynamic password authentication method proposed by the inventor of this application (A. Shimizu, "A Dynamic Password Authentication Method Using a One-Way Function," Systems and Computers in Japan, Vol. 22, 1991, pp. 32–40).

With the Lamport method, a one-way function is preapplied to the password a plurality of times and, for each authentication, data of the immediately preceding authentication session is presented to the verifier, by which authentication can be done a plurality of times. With this method, the initially set maximum number of authentication sessions is decremented by 1 upon each execution of authentication and when the preset number of authentication sessions is exhausted, the password must be reset. If the number of times the one-way function is applied is increased with a view to increasing the maximum number of authentication sessions, the amount of processing would inevitably increase. Another problem is that the prover's processing workload is too large in terms of its processing ability which is poor as compared to that of the verifier.

With the CINON method, for each authentication session, the prover (user) sends to the verifier (host) three pieces of data: data from which authenticated data registered after its validity check in the immediately previous authentication session is assumed to have originated, authenticated data for use in the authentication session after the next, and data for checking the validity of the data transmitted in the previous authentication session and for use in the next session. By this, it is possible to execute authentication sessions one after another while securely updating the authentication information.

A description will be given of the CINON authentication procedure. The notation used is described first, as follow:
<Notation>

The one-way transform by the secret-key cryptoalgorithm E is represented by C=E(P,K), where C is one-way transform data, P the plaintext, and K the secret key.

Let S represent the prover's secret information, that is, the password.

N is an integer equal to or greater than 0 and indicates the number of authentication sessions, i.e. the number of times authentication is executed.

Let A represent the prover's identifier, that is, the user ID such as a mail account (the part where information to the prover is stored).

Let $N_n$ represent a random number that is generated corresponding to the number of authentication sessions.

Let $M_n$ represent an authenticator.

$\oplus$ represents an exclusive OR operation for each bit. Setting $V_n = E(A, S \oplus N_n)$, $W_n = E(A, V_n)$.

That is, $W_n$ is data resulting from a twice-applied one-way transform of $S \oplus N_n$. The difficulty in counting back S, $N_n$, or $V_n$ from $W_n$ is dependent on the strength or robustness of the secret-key cryptoalgorithm.

<Authentication Procedure (See FIG. 1)>
Initial Registration Processing

Step S0: The prover (user) performs initial registration processing with the verifier's device (a host device). Initially, the user generates random numbers $N_0$ and $N_1$ at the user terminal and sets the user identifier A and the password S. The user memorizes the password S and stores the random numbers $N_0$ and $N_1$ in his IC card or similar medium.

Next, $W_0$, $W_1$ and $M_0$ are computed carrying out the following procedure:

$$V_0 = E(A, S \oplus N_0)$$

$$W_0 = E(A, V_0)$$

$$V_1 = E(A, S \oplus N_1)$$

$$W_1 = E(A, V_1)$$

$$M_0 = E(W_1, V_0)$$

and they are registered with the verifier's device (the host device). in correspondence with the user identifier A. $W_0$ is authenticated data for use in the next authentication session, $W_1$ is authenticated data for use in the authentication session after the next, and $M_0$ is data for checking the validity of $W_1$.

Authentication Processing and Contents Data Exchange

Upon completion of the initial registration processing (n=0) the, n-th (n=1,2, . . . ) authentication processing is carried out as described below. At this point, $W_{n-1}$, $W_n$, and $M_{n-1}$ and n are already registered in the verifier side in correspondence with the prover's identifier A.

Step S1: The user reads out random numbers $N_{n-1}$, and $N_n$ from the IC card, then generates a new random number $N_{n+1}$.

Step S2: The user computes $V_{n-1}$, $W_{n-1}$ and $M_n$ carrying out the following procedure:

$$V_{n-1} = E(A, S \oplus N_{n-1})$$

$$V_n = E(A, S \oplus N_n)$$

$$V_{n+1} = E(A, S \oplus N_{n+1})$$

$$W_{n+1} = E(A, V_{n+1})$$

$$M_n = E(W_{n+1}, V_n)$$

Step S3: The user sends these pieces of data together with the user identifier A and a service request to the verifier.

$V_{n-1}$ is data from which the data $W_{n-1}$, submitted to a validity check at the verifier side in the previous session and for use in the current authentication session, is assumed to have originated. $W_{n+1}$ is data for use in the authentication after the next session. $M_n$ is data for checking, in the next authentication session, the validity of the authenticated data $W_{n+1}$ that is used in the session after the next.

Step S4: The user updates the random numbers $N_{n-1}$ and $N_n$ of the IC card with $N_n$ and $N_{n+1}$.

Step S5: Next, the host device performs the following authentication processing by the use of $V_{n-1}$, $W_{n+1}$ and $M_n$ sent from the prover.

$W_{n-1}$ is compared with $E(A, V_{n-1})$, and if they agree, the prover is accepted as valid or legitimate. If they do not agree, the prover is rejected as invalid and the processing ends.

When the prover is accepted as valid, the processing proceeds to the comparison of $M_{n-1}$ with $E(W_n, V_{n-1})$; if they agree, $W_n$ is accepted as valid, and if they disagree, the user is rejected as invalid and the processing ends. When the prover is accepted as valid by these two verification steps, the verifier authenticates that $W_{n-1}$, $W_n$ and $M_{n-1}$ are all valid and, in step S6, sends contents data T to the user. Further, in step S7 the verifier newly registers $W_n$, $W_{n+1}$ and $M_n$ in place of the currently registered data.

As described above, the CINON method involves the use of two previously generated random numbers $N_{n-1}$ and $N_n$ when the user gets authentication from the verifier. Hence, in the case of getting authentication of the verifier from a terminal at a visiting site, the user needs to use a storage medium which has stored therein the random numbers $N_{n-1}$ and $N_n$, such as an IC card. The terminal needs to have a random number generating function and an IC card read/write function.

On the other hand, there will be soon introduced on the market so-called Internet home appliances equipped with an Internet connection function, such as TV sets, word processors and portable terminal equipment (Arakawa and Kamata, "Information Network Revolution by Internet Home Appliances," Technical Report of IEICE, OFS96-1, pp. 1–6 (1996.5)).

As such Internet home appliances become widespread, there will grow a demand for contents transmission that involves authentication processing, but almost all of the Internet home appliances have no facilities or mechanisms for generating the afore-mentioned random numbers $N_{n-1}$ and $N_n$ and writing them in and reading them out of an IC card or similar storage medium because their manufacturing costs are paramount. Besides, since the storage area for processing programs is limited, it is desirable that the authentication processing is realized or implemented with as simple and small-sized programs as possible.

SUMMARY OF THE INVENTION

It is therefore an object of the present invention to provide a secure contents control method and apparatus which, in the contents transmission between a prover and a verifier on a network of insufficient security, do not require the prover to have an IC card or similar storage medium read/write facility and enable user authentication processing to be performed with a small-sized program.

Another object of the present invention is to provide a recording medium with the above-mentioned method recorded thereon.

According to a first aspect of the present invention, there is provided a contents transmission control method for authentication processing between user terminal equipment that a user uses on a network and verifier's equipment. The method comprises the steps described below.

(a) As an initial registration procedure, the user computes from his identifier A and a password S, held in secrecy, data $W_0$ for use in the next authentication session, data $W_1$ for use in the session after the next and data $M_0$ for checking the validity of the data $W_1$ and registers them in the verifier equipment together with an initial value n=1 of the authentication session number (the number of times the authentication has been performed so far) n in correspondence with the identifier A.

(b) Next, letting n be a positive integer, the verifier equipment receives, in an n-th authentication session, a service request and the user identifier A from the user terminal equipment, then reads out the authentication session number (the number of times the authentication has been performed so far) n, and sends the number n to the user terminal equipment.

(c) The user terminal equipment uses the user identifier A, the authentication session number n sent from the verifier equipment and the password S held in secrecy to compute data $V_{n-1}$ to be authenticated in the current session, data $W_{n+1}$ for use in the authentication session after the next and data $M_n$ for checking the validity of the data $W_{n+1}$. If the user terminal equipment has contents data desired to be transmitted, it sends the three computed pieces of data to the verifier equipment together with the contents data.

(d) The verifier equipment computes the data $W_{n-1}$ for use in the current authentication session from the user identifier A and the data $V_{n-1}$ sent from the user terminal equipment in step (c), then compares the computed data $W_{n-1}$ with already registered authenticated data $W_{n-1}$, and further compares validity verification data $M_{n-1}$, computed from registered data $W_n$ for use in the next authentication and the data $V_{n-1}$ to be authenticated in the current session, with already registered validity verification data $M_{n-1}$.

(e) When the pieces of data compared in step (d) agree, the verifier equipment accepts the user as valid, then transmits and receives information of the service requested by the user, then updates previously registered data $W_{n-1}$, $W_n$ and $N_{n-1}$ with the data $W_n$ received in the previous authentication session and for use in the next session and the data $W_{n+1}$ for use in the authentication session after the next and the validity verification data $M_n$ for the data $W_{n+1}$ which were sent from the user terminal equipment in the current session, and the verifier equipment increments the authentication session number n by one.

(f) If the pieces of data do not agree in step (d), the verifier equipment decides the user is invalid or unauthorized and rejects contents transmission thereafter and holds intact the data $W_{n-1}$, $W_n$, $M_n$ and n registered in the previous session.

According to a second aspect of the present invention, there is provided a contents transmission control method for performing authentication processing between user terminal equipment and verifier equipment in a system wherein the user terminal equipment and a transit server are connected to the Internet and the verifier equipment is connected to an intra-network connected to the Internet so that contents transmission between the user terminal equipment and the verifier equipment is made via the transit server. The method comprises the steps described below.

(a) The user computes from his identifier A and a password S, held in secrecy, data $W_0$ for use in the next authentication, data $W_1$ for use in the authentication after the next session and data $M_0$ for checking the validity of the data $W_1$, then registers these three pieces of data in the verifier equipment in correspondence with the user identifier A, and the initial value n=1 of the authentication session number (the number of times the authentication has been performed so far) n in the verifier equipment and the transit server in correspondence with the user identifier A.

(b) Letting n be a positive integer, the transit server receives, in an n-th authentication, a service request and the user identifier A from the user terminal equipment, then reads out the authentication session number n, and sends the number n to the user terminal equipment.

(c) The user terminal equipment uses the user identifier A, the authentication session number n sent from the verifier equipment and the password S held in secrecy to compute data $V_{n-1}$ to be authenticated in the current session, data $W_{n-1}$ for use in the authentication session after the next and data $M_n$ for checking the validity of the data $W_{n+1}$. If the user terminal equipment has contents data desired to be transmitted, it sends the three computed pieces of data via the transit server to the verifier equipment together with the contents data and thereafter temporarily breaks off its connection with the transit server.

(d) The verifier equipment computes the data $W_{n-1}$ for use in the current authentication session from the user identifier A and the data $V_{n-1}$ sent from the user terminal equipment in step (c), then compares the computed data $W_{n-1}$ with already registered authenticated data $W_{n-1}$, and further compares validity verification data $M_{n-1}$ computed from registered data $W_n$ for use in the next authentication and the data $V_{n-1}$ to be authenticated in the current session, with already registered validity verification data $M_{n-1}$.

(e) When the pieces of data compared in step (d) agree, the verifier equipment accepts the user as valid, then transfers information of the service requested by the user to the transit server and stores therein the information. If the verifier equipment has contents information desired to be transmit, it transmit the information in the capacity of a certified or authorized user and sends to the transit server confirmation information indicating completion of the transmission.

(f) The verifier equipment further updates previously registered data $W_{n-1}$, $W_n$ and $M_{n-1}$ with the data $W_n$ received in the previous authentication session and for use in the next session and the data $W_{n+1}$ for use in the authentication session after the next and the data $M_n$ for validity checking of the data $W_{n+1}$ which were sent from the user terminal equipment in the current session, and the verifier equipment increments the authentication session number n by one. If the afore-said pieces of data do not agree in step (d), the verifier equipment decides the user is invalid or unauthorized and rejects contents transmission thereafter and holds intact the data $W_{n-1}$, $W_n$, $M_n$ and n registered in the previous session.

(g) The transit server receives the service information or transmission confirmation information and then increments the authentication session number n by one.

(h) The user makes its connection with the transit server again at a given time after a certain lapse of time subsequent to its disconnection from the transit server, then performs in cooperation therewith authentication processing for checking the validity of the user with respect to the service information, and receives the service information.

In this case, high-speed communication protocols are used for the contents transmission between the user terminal equipment and the transit server and electronic-mail protocols for the contents transmission between the transit server and the verifier equipment.

According to a third aspect of the present invention, there is provided a contents control method by which a user performs authentication processing between himself and verifier equipment (an account management center) in the case where user terminal equipment, a service provider and the account management center are connected to the Internet and the user receives services from the service provider on the Internet. The method comprises the steps described below.

(a) The user computes, from his account A and password S, data $w_0$ for use in the next authentication session, data $W_1$ for use in the authentication session after the next and data $M_0$ for checking the validity of the data $W_1$ and registers them, together with an initial value n=1 of the authentication session number (the number of times the authentication has been performed so far) n and an amount of money X, In the accounting management center in correspondence with the user account A.

(b) The user sends to the service provider a service request signal requesting a desired service and the account A.

(c) The service provider transfers the received account A to the accounting management center.

(d) The accounting management center reads out the authentication session number n corresponding to the account A and sends it to the service provider.

(e) The service provider sends the received authentication session number n to the user terminal equipment together with an Applet program that is an authentication procedure.

(f) The user follows the authentication procedure to calculate authentication data $V_{n-1}$, $W_{n+1}$ and $M_n$ and send them to the service provider, together with the Account A.

(g) The service provider sends to the accounting management center the data $V_{n-1}$, $W_{n+1}$ and $M_n$, together with an account $A_p$ of the service provider and the amount of money x charged for the service.

(h) The account management center makes sure that the amount of money x is smaller than the balance (the money left over) X registered in correspondence with the Account A, then verifies the received data $V_{n-1}$ and the registered data $W_n$ for use in the next authentication, and if they are both correct or valid, sends an authentication confirm signal OK to the service provider, while at the same time the account management center updates the previously registered data $W_0$, $W_1$ and $M_0$ with those $W_n$, $W_{n+1}$ and $M_n$, then increments the authentication session number n by one, and updates the balance X of the Account A with X−x and the balance $X_p$ of the provider's account $A_p$ with $X_p$+x.

(i) Upon receiving the confirm signal OK, the service provider offers the designated service to the user.

According to a fourth aspect of the present invention, there is provided verifier equipment which effects contents transmission control for authenticating the validity of a user on a network, the equipment comprising:

registered data storage means wherein, letting n be a positive integer, data $W_{n-1}$ for use in the next authentication session, data $W_n$ for use in the authentication session after the next and data $M_{n-1}$ for checking the validity of the data $W_n$ are registered, together with the authentication session number (the number of times the authentication has been performed so far) n, in correspondence with a user identifier A in an (n−1)th authentication session;

authentication session number sending means which, in an n-th authentication session, receives a service request and the user identifier A from terminal equipment of the user, then reads out the authentication session number n of the user from the registered data storage means, and sends the read-out authentication session number n to the user terminal equipment;

receiving means for receiving from the user terminal equipment data $V_{n-1}$ to be authenticated in the current authentication session, data $W_{n+1}$ for use in the authentication session after the next and data $M_n$ for checking the validity of the data $W_{n+1}$;

authentication means for comparing data $W_{n-1}$ for use in the current authentication session, computed from the user identifier A and the received data $V_{n-1}$ to be authenticated in the current session, with the data $W_{n-1}$ registered in the registered data storage means and for comparing validity check data $M_{n-1}$, computed from the registered data $W_n$ for use in the next authentication session and the data $V_{n-1}$ to be authenticated in the current session, with the registered validity check data $M_{n-1}$; and registration update means which, when the results of comparison by the authentication means agree, accepts the user as valid or authorized, then updates the data $W_{n-1}$, $W_n$ and $M_{n-1}$ registered in the registered data storage means with the registered data $W_n$ for use in the next authentication session, the currently received data $W_{n+1}$ for use in the authentication session after the next and the data $M_n$ for checking the validity of the data $W_{n+1}$, and increments the authentication session number n by one.

According to a fifth aspect of the present invention, there is a recording medium which has recorded thereon a verifier's authentication procedure for authenticating the validity of a user on a network, the authentication procedure comprising the steps described below.

(a) The verifier computes initial data values $W_0$, $W_1$ and $M_0$ by the following one-way functions using an identifier A and password S of a user and registers the values in registered data storage means:

$$V_0 = E(A, S)$$

$$W_0 = E(A, V_0)$$

$$V_1 = E(A, S \oplus 1)$$

$$W_1 = E(A, V_1)$$

$$M_0 = E(W_1, V_0)$$

(b) Letting n be a positive integer, the verifier receives in an n-th authentication session a service request and the user identifier A from the user terminal equipment, then reads out the authentication session number (the number of times the user has been authenticated so far) n from the registered data storage means and sends it to the user terminal equipment.

(c) The verifier receives from the user terminal equipment data $V_{n-1}$ to be authenticated in the current authentication session, data $W_{n-1}$ for use in the authentication session after the next and data $M_n$ for checking the validity of the data $W_{n+1}$.

(d) The verifier computes, by a one-way function $W_{n-1} = E(A, V_{n-1})$, the data $W_{n-1}$, for use in the current authentication session from the user identifier A and the received data $V_{n-1}$ to be authenticated in the current authentication session, then compares the computed data $W_{n-1}$ with authenticated data $W_{n-1}$ registered in the registered data storage means, then computes, by a one-way function $M_{n-1} = E(W_n, V_{n-1})$, validity check data $N_{n-1}$ from the registered data Wn for use in the next authentication session, and compares the computed data $M_{n-1}$ with registered validity check data $M_{n-1}$.

(e) When the results of both comparisons agree at the same time, the verifier accepts the user as valid or authorized, then updates the data $W_{n-1}$, $W_n$ and $M_{n-1}$ registered in the registered data storage means with the registered data Wn for use in the next authentication session, the currently received data $W_{n+1}$ for use in the authentication session after the next and the data $M_n$ for checking the validity of the data $W_{n+1}$.

According to a sixth aspect of the present invention, there is provided a recording medium which has recorded thereon a procedure for authenticating a user by a verifier on a network, the procedure comprising the steps of:

(a) sending a service request and a user identifier A to equipment of the verifier;

(b) receiving from the verifier equipment the authentication session number (the number of times the authentication has been performed so far) n, n being a positive integer;

(c) computing data $V_{n-1}$ to be authenticated in the current authentication session, data $W_{n+1}$ for use in the authentication session after the next and data $M_n$ for checking the validity of the data $W_{n+1}$ from the user identifier A, the received authentication session number n and a user's password held in secrecy by the following one-way functions, and sending the computed data to the verifier equipment:

$$V_{n-1} = E(A, S \oplus (n-1))$$

$$V_n = E(A, S \oplus n)$$

$$V_{n+1} = E(A, S \oplus (n+1))$$

$$W_{n+1} = E(A, V_{n+1})$$

$$M_n = E(W_{n+1}, V_n)$$

The most important feature of the present invention resides in that the authentication procedure uses the authentication session number (i.e. the number of times authentication has been performed) at the time of generating authenticated data, in place of random numbers used in the prior art.

The present invention utilizes secret-key cryptosystems, such as DES, FEAL and the like, in the one-way transformation for the generation of the authenticated data. With these cryptosystems, even if the plaintext or secret-key input varies one bit, it is possible to obtain an output without the slightest trace of the input change as referred to previously. In contrast to the prior art that generates authenticated data by using two keys which are the random number and the password held in secrecy, the present invention utilizes the above-mentioned feature of the one-way transformation and uses, as one of the keys, the authentication session number that is a constant. By this, it is possible to realize easy contents transmission that has an authentication function of the same strength or robustness as in the past and does not require integration of a read/write mechanism and a random number generating mechanism into the IC card for storage of random numbers that is one of the objects of the present invention. That is, the present invention uses the authentication session number as a substitute for the random number in the prior art, but the security of authentication depends on the one-way functions, i.e. on the strength or robustness of the secret-key cryptosystem used and is not affected by the use of the authentication session number.

DESCRIPTION OF THE PREFERRED EMBODIMENTS

[Embodiment 1]

Figure 2:
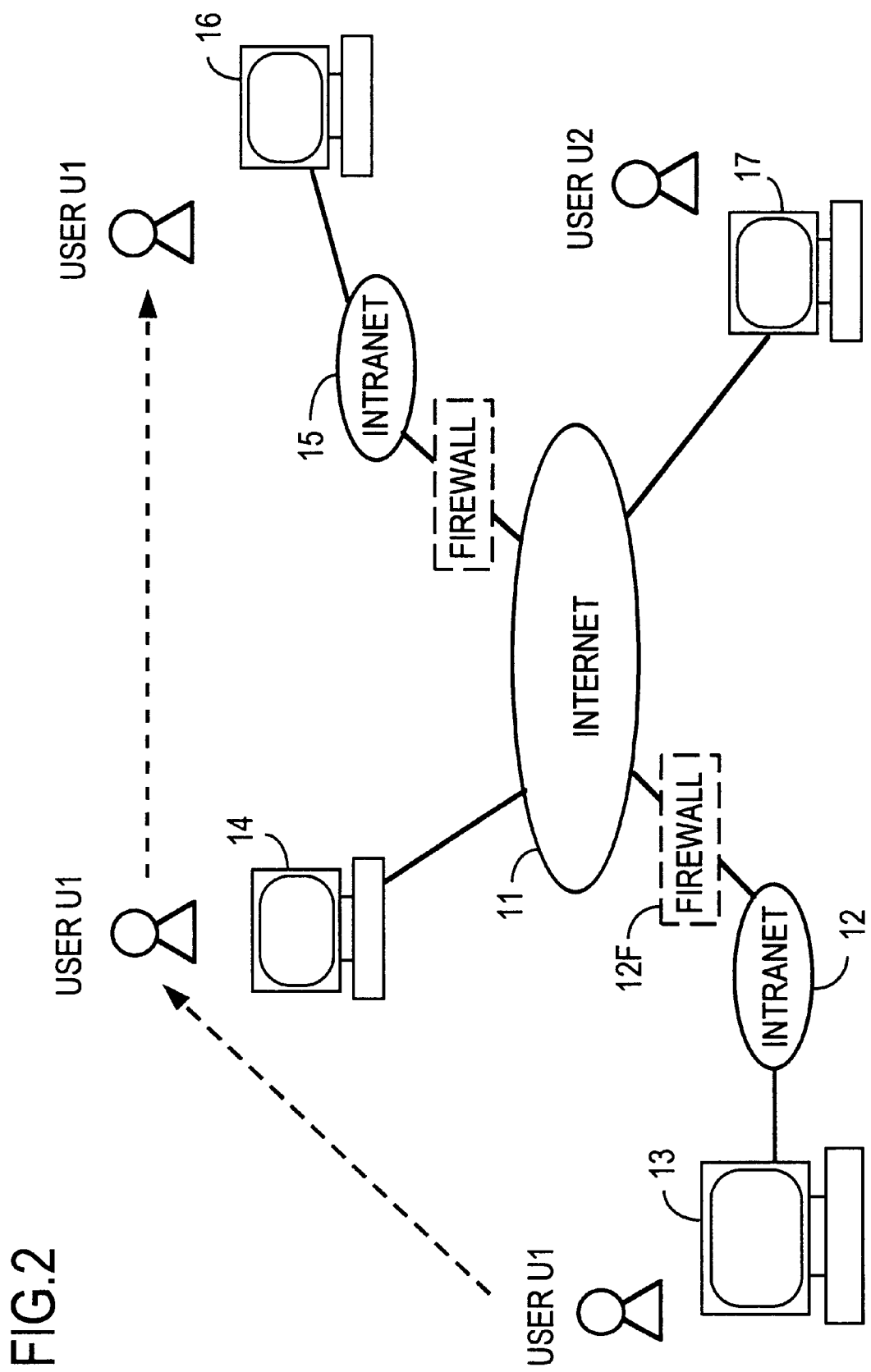
FIG. 2 is a schematic diagram showing the outline of a system for public e-mail forwarding services according to a first embodiment of the present invention.

FIG. 2 is a schematic diagram for explaining the outline of a first embodiment of the present invention.

With the recent proliferation of the Internet, e-mail has come into wider use especially in the fields of business as means for communication via the Internet. And there has been a growing demand mainly by business users for services that permit e-mail messages to be sent and received in the field.

In personal computer communications, since an access is made to a common center via a telephone network to read and write messages, it is possible to send and receive messages by connecting a portable personal computer with a modem function to the ISDN public telephone network via a terminal at a visiting site, for instance.

In the Internet, too, it is possible to access a mail server via the telephone network just like the common center in the personal computer communications; in many cases, however, a call back to a preregistered telephone number is required or an access via a modem is limited for security reasons. Moreover, the number of telephone circuits prepared for the access via modem is usually so small that the circuits are mostly busy and the access cannot easily be made. Hence, an access from an indefinite visiting site is difficult to make in many instances.

In the case of considering a connection at an IP address level (layer 3 connection) characteristic of the Internet, a connection request from an indefinite visiting site, that is, from an unspecified IP address, is rejected by a firewall 12F disposed at an entrance to an internal network 12 wherein a mail server 13 is placed. That is, provision is only made to permit the passage through the firewall of a protocol (SMTP: Simple Mail Transfer Protocol) for use in the e-mail (layer 7). This embodiment will be described in connection with the case of applying the invention to the user authentication by the mail server in public e-mail messages forwarding services which enable mail messages to be securely received and sent at a visiting site via the Internet without using the telephone network while evading the firewall.

A description will be given of general requirements and security requirements that the public e-mail forwarding services need to have.

First, the general requirements of the public e-mail forwarding services described herein are such as listed below.

(1) The user of this service has a unique mail account in the mail server on the Internet.

(2) The user is allowed to use an application of this service either in a home environment wherein the mail account unique to the user is available or in the visiting-site environment wherein the mail account is not available.

(3) The user is allowed to receive, at a visiting sites e-mail messages sent to its true account through utilization of a temporary account. Similarly, the user can transmit e-mail messages from the true account through utilization of the temporary account. The temporary account herein mentioned is, for example, accessed via a terminal, connected to the Internet, whose use is offered to the public or the account of a different Internet user.

In the example of FIG. 2, the internal network 12, such as a LAN, is connected to the internet 11, and the host equipment (server equipment: verifier equipment) 13, which has the mail account of a user U1, is connected to the internal network. The user U1 receives e-mail messages sent to its mail account in the host equipment via the internal network 12 connected to the host equipment 13.

When the user U1 moves out of the internal network 12, the user U1 can receive e-mail messages sent to his mail account by inputting his identifier A and password S, for example, into a personal computer 14 that is a member of the Internet 11, then sending the user identifier A, as e-mail messages, to the host equipment (verifier equipment) 13 that has the mail account of the user U1, and performing the authentication procedure according to the present invention between the user U1 and the host equipment 13. That is, the user U1 can receive the e-mail messages sent to his true account A by temporarily using the account of the personal computer 14 that is a member of the Internet 11.

Further, by inputting the identifier A and the password S of the user U1 into a terminal 16 accommodated in another internal network 15 connected to the Internet 11, then inputting the identifier A as e-mail messages into the host equipment 13 via the route [internal network 15-Internet 11-Internal network 12] and performing the authentication procedure according to the present invention, the user U1 can similarly read e-mail messages sent to his mail account.

However, even if a different user U2 impersonates the user U1 and tries to read information sent to the mail account of the latter via a terminal 17, that is, even if the user U2 accesses the host equipment 13 through the use of the identifier A of the user U1, the former cannot correctly execute the authentication procedure without knowledge of the latter's password S, and hence the user U2 cannot extract the information sent to the mail account of the user U1 in the host equipment 13.

The above has described readout (reception) of e-mail messages; a write (transmission) of e-mail messages can also be done in a similar manner.

With the general requirements fulfilled, the public e-mail messages forwarding services permit the reception and transmission of e-mail messages as described above, whereas the public e-mail messages forwarding services need to meet such security requirements as listed below.

(1) By the authentication of his stored password or the like, the user can evade the firewall set in the environment in which the mail server is present and the user is allowed to securely receive e-mail message forwarding services in the field. In contrast thereto, no unauthorized person is permitted to send and receive e-mail messages.

(2) The user's password is protected from being stolen on the communications line and from a data base in the mail server.

(3) The processing workload for authentication is small in either of the environment in which the user's mail account is present and the environment at the visiting site.

In particular, data on the Internet is readily stolen; therefore, it is absolutely necessary to avoid using a procedure of the type that the password flows intact on the channel line.

In this embodiment the present invention is applied to the authentication procedure in the e-mail messages forwarding services that meet the requirements (1), (2) and (3). Hence, an e-mail communication protocol is used for communications between the user and the mail server. Incidentally, notation in the following description is the same as that used for the description of the prior art.

<Initial Registration Processing (FIG. 3)>

Step S0: As initial registration processing, the user sets his identifier (mail account) A and the initial value n=0 of the authentication session number n directly in the mail server 13.

Next, the mail server 13 follows the procedure mentioned below to compute $W_0$, $W_n$ and $M_0$ and registers them in correspondence with the user's mail account A. Further, the mail server 13 increments the authentication session number n by one and registers it in correspondence with the identifier A.

$$V_0 = E(A, S) \tag{1a}$$

$$W_0 = E(A, V_0) \tag{1b}$$

$$V_1 = E(A, S \oplus 1) \tag{1c}$$

$$W_1 = E(A, V_1) \tag{1d}$$

$$M_0 = E(W_1, V_0) \tag{1e}$$

$W_0$ represents data for use in the next authentication session, $W_1$ is data for use in the authentication session after the next and $M_0$ is data for checking the validity of the data $W_1$.

<Authentication Processing and Mail Messages Exchange>

Figure 3:
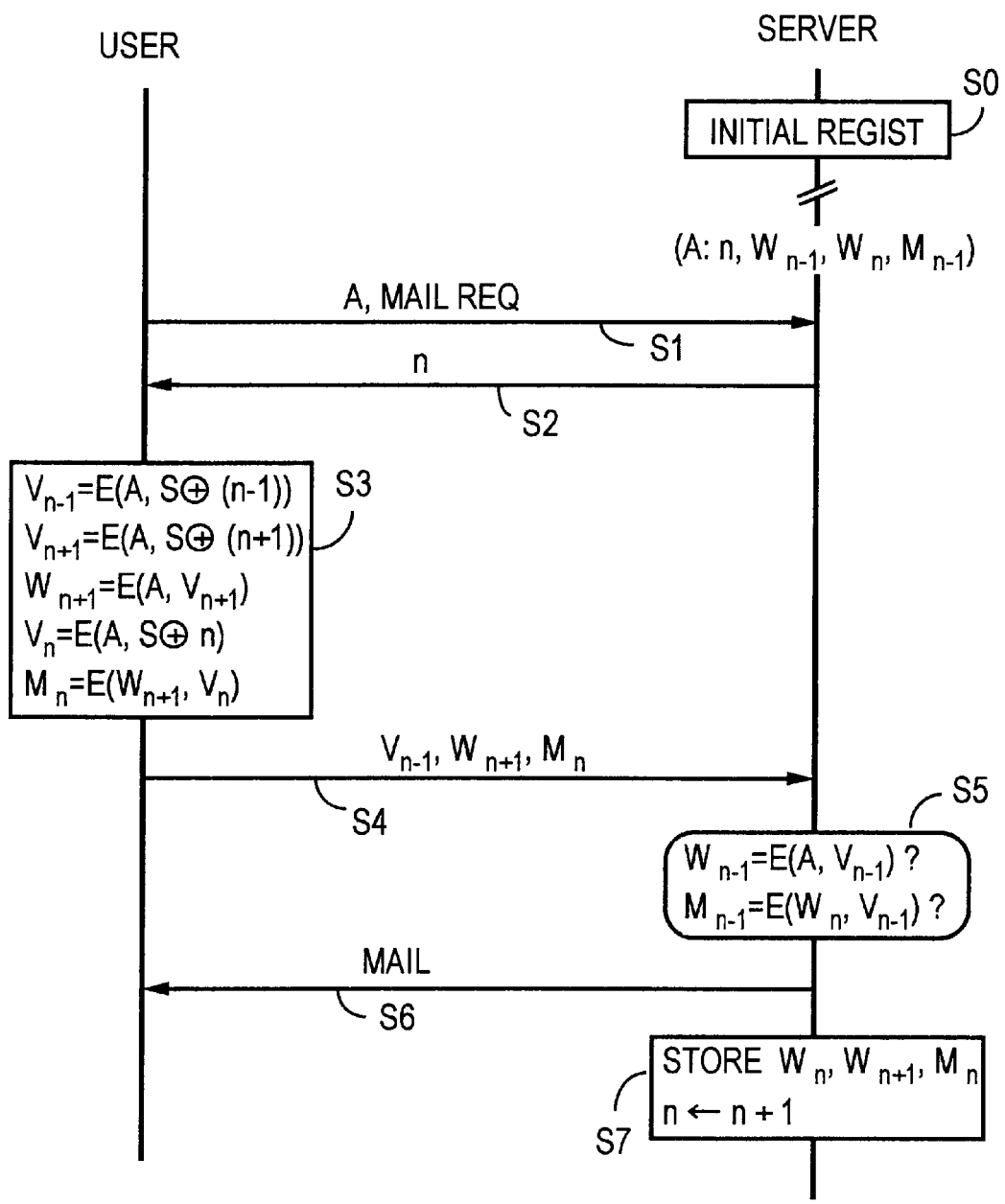
FIG. 3 is a diagram showing in detail public e-mail forwarding protocols according to the first embodiment.

FIG. 3 shows an n-th (n=1,2, . . . ) authentication procedure after the initial registration processing.

S1: The user at a visiting site sends a mail service request (hereinafter referred to a mail request) in the form of an e-mail with a particular header (SMPT) from a terminal in the field (the terminal 14 in FIG. 2) to the mail server with the user's mail account set therein and, at the same time informs the mail server 13 of the mail account A. The mail request is to designate any one of a mail transmission, a mail reception, a file forwarding and forwarded file reception.

step S2: Upon receiving the mail request from the user in the field, the mail server 13 sends by mail back to the user the authentication session number n registered in correspondence with the main account A. At this point, data $W_{n-1}$, $W_n$ and $M_{n-1}$ are already registered in the host equipment.

Step S3: The user receives the value n from the mail server by mail and computes $V_{n-1}$ $W_{n+1}$ and $M_n$, following the procedure listed below.

$$V_{n-1} = E(A, S \oplus (n-1)) \tag{2a}$$

$$V_n = E(A, S \oplus n) \tag{2b}$$

$$V_{n+1} = E(A, S \oplus (n+1)) \tag{2c}$$

$$W_{n+1} = E(A, V_{n+1}) \tag{2d}$$

$$M_n = E(W_{n+1}, V_n) \tag{2e}$$

Step S4: The user send his mail server by mail the above computed data and information about a mail desired to send, if any. $V_{n-1}$ is data from which data (called one-way transformed data) transformed by a one-way function, submitted to a validity check at the verifier side in the previous session and for use in the current authentication session, is assumed to have originated. $W_{n+1}$ is one-way transformed data for use in the authentication session after the next. $M_n$ is data for checking, in the next authentication session, the validity of the one-way transformed data $W_{n+1}$ that is used in the authentication session after the next.

Step S5: The mail server performs the following authentication processing, using the data $V_{n-1}$, $W_{n+1}$ and $M_n$ received from the user.

The registered data $W_{n-1}$ and $E(A, V_{n-1})$ computed by a one-way function E, using the received data $V_{n-1}$, are compared, and when they agree, the user is accepted as valid or authorized. If they do not agree, the user is rejected as invalid or unauthorized and the processing ends.

When the user is accepted as valid, the data $M_{n-1}$ is compared with $E(W_n, V_{n-1})$, and if they agree, the data is accepted as valid. If they do not agree, the data $W_n$ is rejected as invalid and the processing ends. The data $W_n$, if accepted as valid, is used as data $W_{n-1}$ to check the validity of received data $V_{n-1}$ (the validity of the user) in the next authentication session (n+1).

Step S6: When the user and the data $W_n$ are accepted as valid, newly received mail addressed to the user, if any, is sent by mail to the user. If there is mail desired to be sent from the user, it is sent on the user's true account.

Step S7: The mail server newly registers $W_n$, $W_{n+1}$ and $M_n$ in place of the currently registered data $W_{n-1}$, $W_n$ and $M_{n-1}$ and increments the value n by one.

A left-directed arrow show in step S7 of FIG. 3 represents that the left-hand side of the arrow is substituted by the right-hand side. The same applies in the description and drawings, hereinafter.

Figure 4:
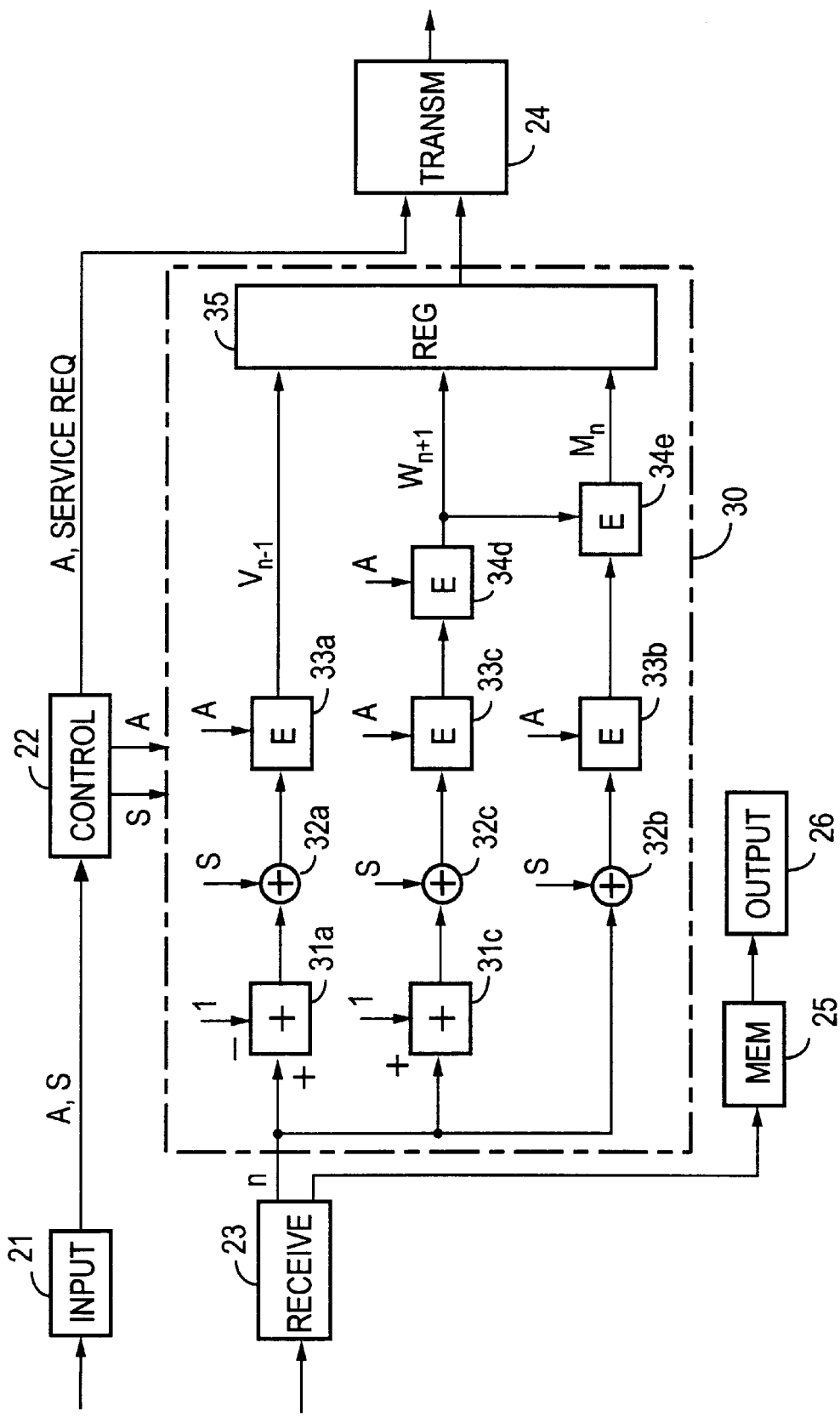
FIG. 4 is a functional block diagram of a user terminal in the first embodiment.

FIG. 4 is a functional block diagram of the user terminal for use in the first embodiment. The user terminal comprises an input part 21, a control part 22, a reception part 23, a transmission part 24, an authentication data generating part 30, a memory 25 and an output part 26. The user inputs the identifier A, the password S, a connected address (mail server address), the mail request and other information into the input part 21. The control part 22 sends the mail request and identifier A from the transmission part 24 to the mail server and, at the same time, sets the identifier A and the password S in the authentication data generating part 30. The authentication session number n received by the reception part 23 from the mail server is provided to a subtractor 31a, wherein it is decrementing by one, and the subtractor output n−1 is exclusive ORed with the password S in an exclusive OR part 32a. The output from the exclusive OR part 32a is provided to a one-way function part 33a, together with the identifier A, wherein data $V_{n-1}$ is calculated by Eq. (2a). The authentication session number n received in the reception part 23 is also provided to an adder 31c, wherein it is added with one, and the adder output n+1 is exclusive ORed with the password S in an exclusive OR part 32c. The output from the exclusive OR part 32c is fed to a one-way function part 33c, together with the identifier A, wherein data $V_{n+1}$ is calculated by Eq. (2c). The data $V_{n+1}$ is provided to a one-way function part 32d, together with the identifier a, wherein data $W_{n+1}$ is calculated by Eq. (2d). Further, the authentication session number n is also provided to an exclusive OR part 32b, wherein it is exclusive ORed with the password S. The ORed output is fed to a one-way function part 33b, together with the identifier A, wherein data Vn is calculated by Eq. (2b). The data Vn and the output Wn+1 from the one-way function part 34d are provided to a one-way function part 34e, wherein data Mn is calculated by Eq. (2e). The authentication data Vn−1, Wn+1 and Mn thus calculated are temporarily stored in a register 35, from which they are sent via the transmission part 24 to the mail server.

After the authentication by the mail server 13, mail messages received from the mail server 13 are temporarily stored in the memory 25, from which they are output to the output part 26 such as a printer, display, or the like.

The control part 22, the memory 25 and the authentication data generating part 30 in the functional configuration of the user terminal of FIG. 4 are implemented, in practice, as computer software. That is, the terminal computer has a recording medium having recorded thereon programs for executing the procedure of the user in FIG. 3 and follows the programs to perform the authentication procedure of the user.

Figure 5:
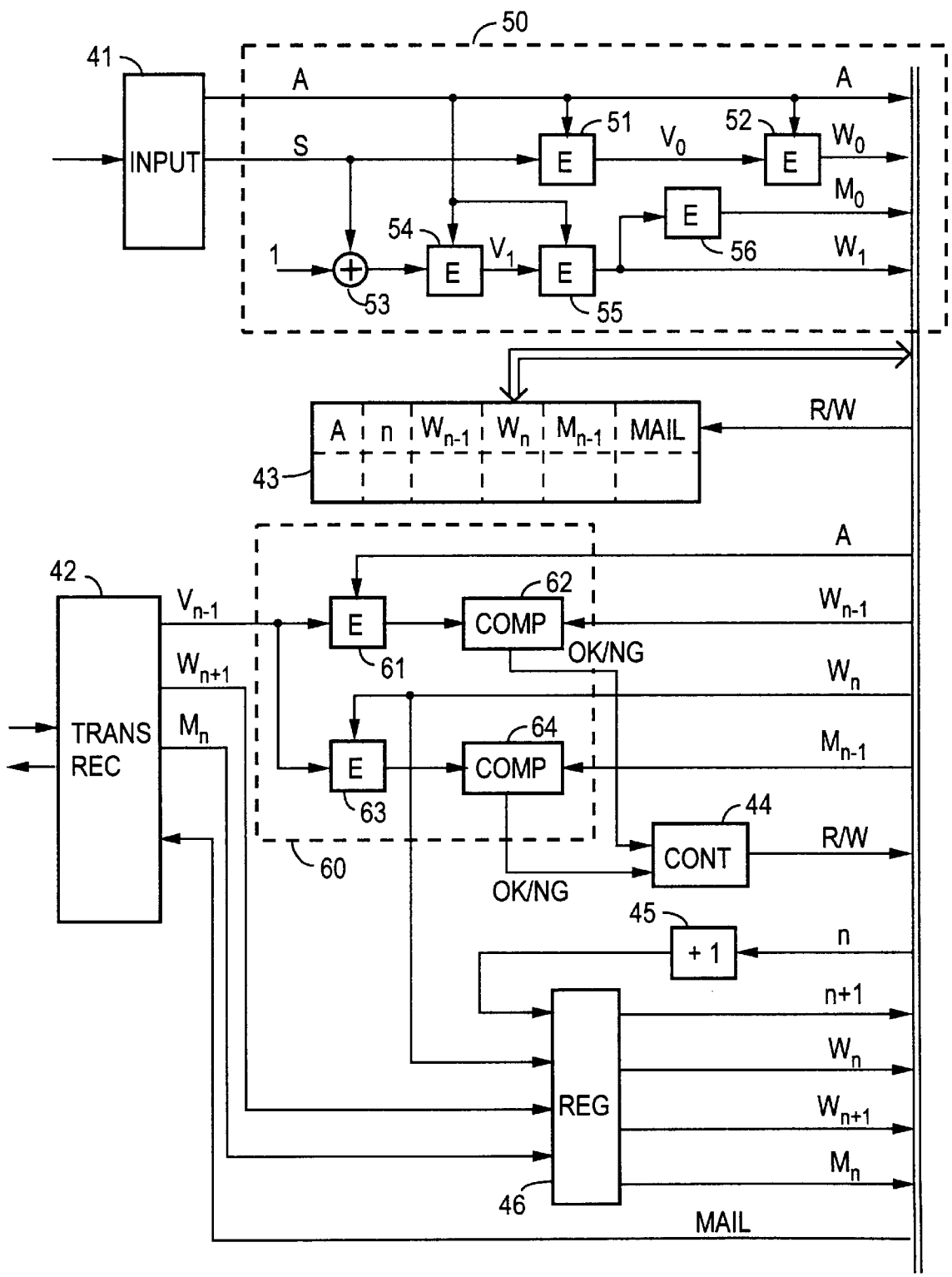
FIG. 5 is a functional block diagram of a main server in the first embodiment.

FIG. 5 is a functional block diagram of the mail server 13 in the embodiments shown in FIGS. 2 and 3. The mail server 13 is composed of an input part 41, an initial registration part 50, an authentication part 60, a control part 44, an authentication session number increment part 45 and a memory 43. The initial registration part 50 comprises a one-way function part 51 for calculating $V_0$ by Eq. (1a) from the identifier (mail account) A and the password S input by the user via the input part 41 at the time of the initial registration (Step S0), a one-way function part 52 for calculating $W_0$ by Eq. (1b) from the calculated $V_0$ and the identifier A, a one-way function part 53 for exclusive ORing the password S and 1 in Eq. (1c), a one-way function part 54 for calculating $V_1$ by Eq. (1d) from the exclusive ORed output and the identifier A, a one-way function part 55 for calculating $W_1$ by Eq. (1d) from $V_1$ and the identifier A, and a one-way function part 56 for calculating $M_0$ by Eq. (1e) from $W_1$ and $V_0$.

The control part 44 registers these computed initial values $W_0$, $W_1$ and $M_0$ in the memory 43 in correspondence with the identifier A. The authentication session number increment part 45 increments the number n by one and the incremented value is stored in the memory 43 in correspondence with the identifier A.

In an n-th user authentication, there are temporarily held in the register 46 the incremented value n+1 resulting from the +1 incrementing by the part 45 of the authentication session number n read out of the memory 43, the data for authentication $W_{n+1}$ and $M_n$ received from the user and the data $W_n$ read out of the memory 43. The authentication part 60 comprises a one-way function part 61 which calculates $E(A, V_{n-1})$ from the identifier A received from the user and the data $V_{n-1}$, a comparison part 62 which compares the calculated data $W_{n-1}$ and the data $W_n$ read out of the memory 43 in correspondence with the identifier A and outputs the comparison result OK/NG indicating whether they agree (OK) or disagree (NG) with each other, a one-way function part 63 which calculates data $M_{n-1}$ from the received data $V_{n-1}$ and the data $W_n$ read out of the memory 43, and a comparison part 64 which compares the data $M_{n-1}$ with the data $N_{n-1}$ read out of the memory 43 and outputs the comparison result indicating whether they agree or disagree. If the outputs from the comparison parts 62 and 64 are both OK, the control part 44 reads out a mail message addressed to the user from the memory 43, then sends it to the user via a transmission/reception part 42 and at the same time updates the data n, $W_{n-1}$, $W_n$ and $M_{n-1}$ registered in the memory 43 with the data n+1, $W_n$, $W_{n+1}$ and $M_{n-1}$ held in the register 46.

The memory 43, the control part 44, the increment part 45, the register 46, the initial registration part 50 and the authentication part 60 in the functional configuration of the mail server 13 shown in FIG. 5 are implemented as computer software. That is, the mail server computer has a recording medium having recorded thereon programs for executing the procedure by the mail server in FIG. 3 and executes the authentication processing by the server following the recorded programs.

In the above-described embodiment, when the one-way transformation is implemented by the FEAL cryptosystem, the authentication processing at the prover side can be described by a program of a size of about 0.6 K bytes (0.4 K bytes occupied by FEAL).

Figure 1:
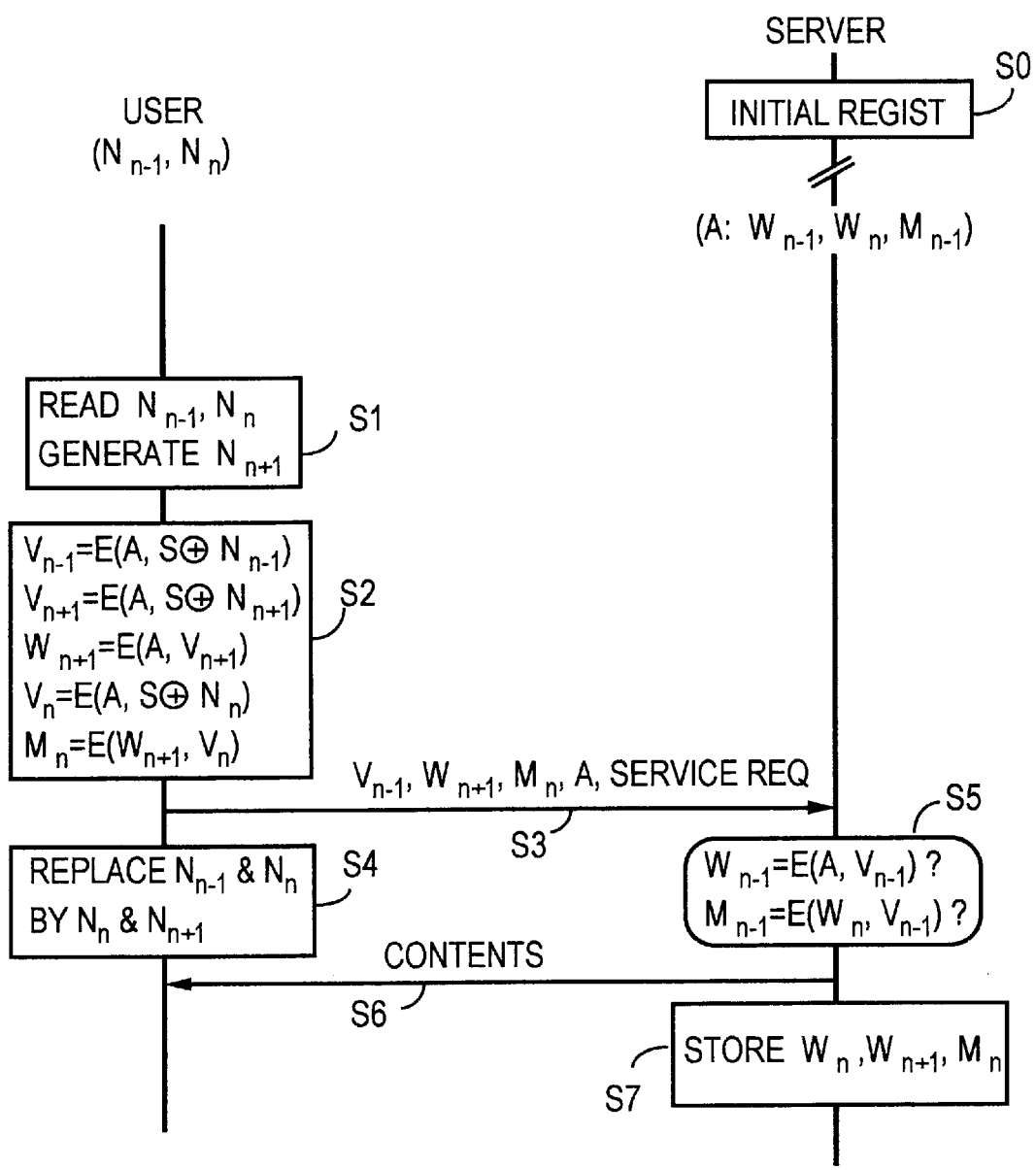
FIG. 1 is a diagram showing a conventional CINON authentication procedure.

As described above, the present invention does not directly send the user's password S to the mail server in the authentication processing as in the CINON method referred to previously in respect of FIG. 1, ensuring secure authentication processing via the Internet. In addition, the present invention does not use random numbers needed in the CINON method, and hence it does not require an IC card or like recording medium for storing the random numbers, nor does it require the random number generating function and the IC card read/write function. The nonuse of random numbers produces the reduction of the data size for the authentication processing. Thus, the authentication processing time of the host equipment is shorts This means that host equipment with limited performance is acceptable for the present invention.

[Embodiment 2]

While in the above the authentication method of the present invention has been described as being applied to the authentication procedure between the user and the mail server in the e-mail messages forwarding services using the SMPT communication, the invention is also applicable to the authentication procedure between the user and the host in the case where the user receives, by the HTTP communications, various services by the host server on the Internet. This will be described below; further, a description will be given of the case where the user uses his authentication procedure (program) received as an Applet from the host side.

With the recent sophistication and diversification of the Internet usage pattern, there will soon become widespread a method according to which the terminal has no various programs integrated thereinto and, for each processing request, receives the required program from the server and executes the program. According to this method, upon receiving a contents transmission request from the user, the server sends to the user the requested procedure (program) embedded in a specific communication unit (for example, Applet) described in a predetermined language such as Java, and the user follows the procedure (program) to perform required processing. This is an epoch-making method that will completely change the concepts of conventional operating systems. As the contents transmission using such a method becomes prevalent in the future, the user authentication function becomes more and more important. Embodiment 2 is an application of the authentication method of the present invention to such an environment.

Incidentally, the notation in the following description is the same as in the above. In the following, the communications are performed using HTTP.

Figure 6:
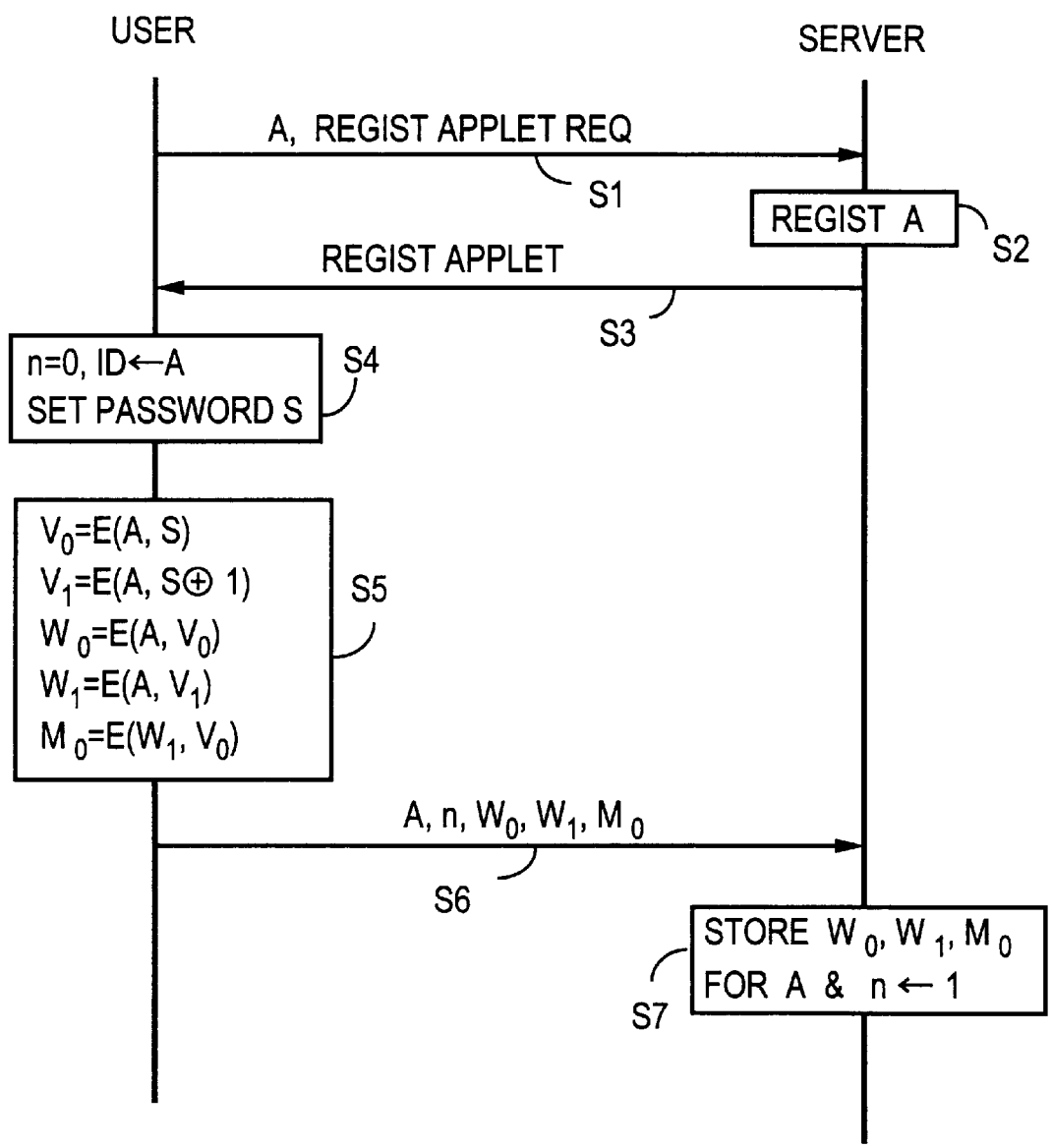
FIG. 6 is a flowchart showing an initial registration procedure in the case of applying the present invention to the execution of an authentication procedure provided by the server through the use of Java Applet.

<Initial Registration Processing (FIG. 6)>

Step S1: The user (prover) sends an initial registration request to the server (verifier equipment), together with the identifier (account) A.

Step S2: The server responds to the request to register the user identifier A.

Step S3: The server sends to the user a communication unit (Applet) that describes initial registration processing.

Step S4: The user uses the Applet program to set the user identifier A and the password S in the user terminal.

Step S5: The user then computes initial data $W_0$, $W_1$ and $M_0$ by the following procedure in accordance with the Applet program:

$$V_0 = E(A, S)$$

$$W_0 = E(A, V_0)$$

$$V_1 = E(A, S \oplus 1)$$

$$W_1 = E(A, V_1)$$

$$M_0 = E(W_1, V_0)$$

$$n \leftarrow n+1$$

$W_0$ is authenticated data for use in the next authentication session, $W_1$ is authenticated data for use in the authentication session after the next, and $M_0$, data for checking the validity of $W_1$.

Step S6: The user sends them to the server, together with he identifier A.

Step S7: The server registers the initial value n=1 of the authentication session number n and the received data $W_0$, $W_1$ and $M_0$ in correspondence with the received identifier A.

Figure 7:
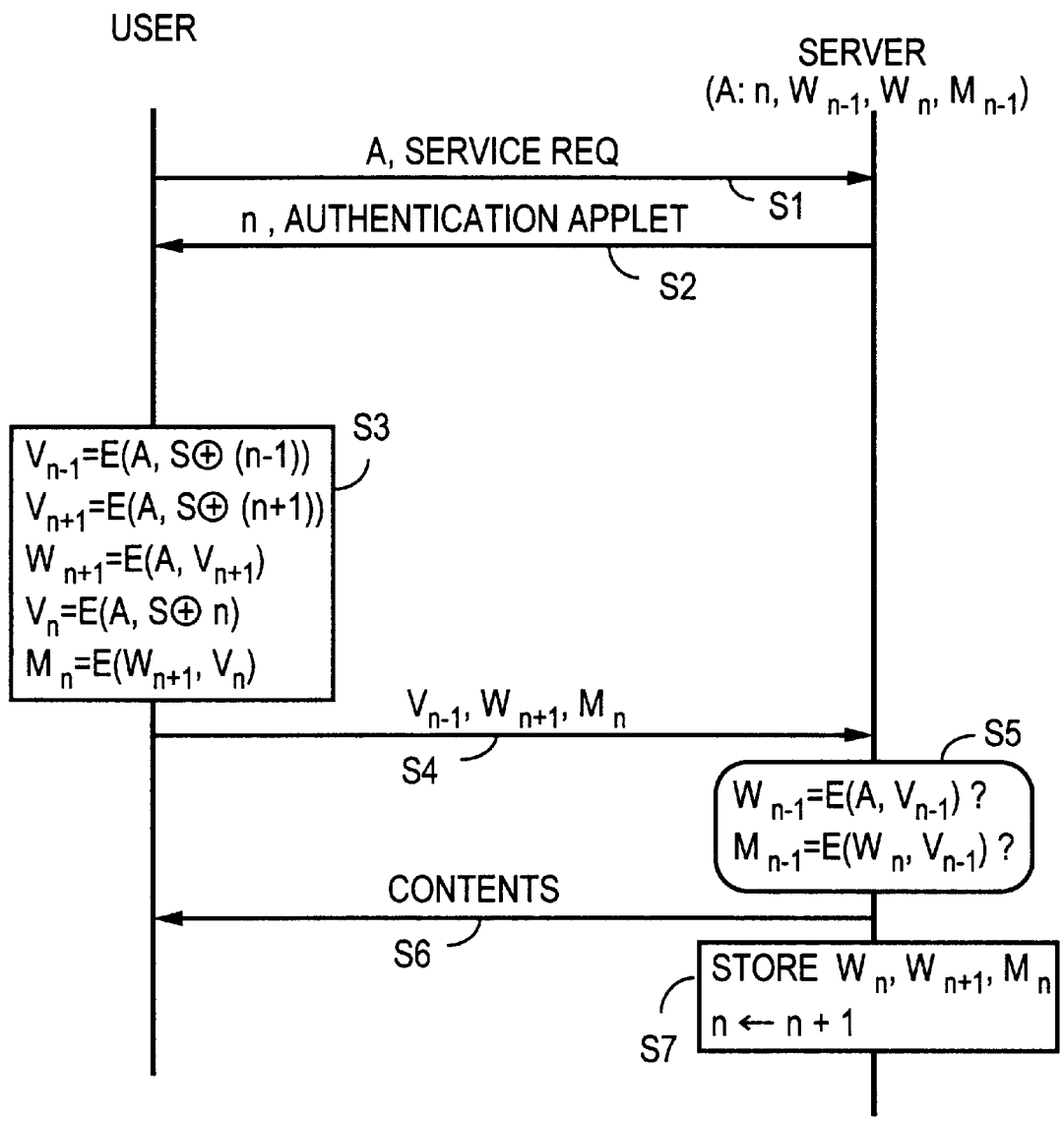
FIG. 7 is a flowchart showing an n-th authentication procedure in a second embodiment of the invention.

<Authentication Processing and Information Exchange (FIG. 7)>

In an n-th (n=1,2, . . . ) authentication after the initial registration processing (step S7 in FIG. 6) the following authentication procedure is carried out. At this point, the data n, $W_{n-1}$, $W_n$ and $M_{n-1}$ are already registered in the host equipment.

Step S1: The user sends a service request to the server, together with the user identifier A.

Step S2: Upon receiving the service request and the user identifier A from the user in the field, the server sends back to the user the authentication processing program Applet and the authentication session number n registered in corresponding to the identifier A.

Step S3: The server receives the authentication processing program Applet and the value n from the server and follows the program Applet to compute data for authentication $W_{n-1}$, $W_{n+1}$ and $M_n$ by the following procedure:

$$V_{n-1} = E(A, S \oplus (n-1))$$

$$V_n = E(A, S \oplus n)$$

$$V_{n+1} = E(A, S \oplus (n+1))$$

$$W_{n+1} = E(A, V_{n+1})$$

$$M_n = E(W_{n+1}, V_n)$$

Step S4: The user sends these pieces of data, $V_{n-1}$, $V_{n+1}$ and $M_n$, and information desired to be sent, if any, to the server.

Step S5: the server performs the following authentication processing based on the data $V_{n-1}$, $W_{n+1}$ and $M_n$ sent from the user.

The data $W_{n-1}$, registered in association with the identifier A and $E(A, V_{n-1})$ computed from the received data $V_{n-1}$ are compared, and when they agree, the user is accepted as valid or authorized. If they do not agree, the user is rejected as invalid or unauthorized and the processing ends.

When the user is accepted as valid, the registered data $M_{n-1}$ and $E(W_n, V_{n-1})$ are compared, and when they agree, the data $W_n$ is decided as valid. If they do not agree, the data $W_n$ is rejected as invalid and the processing ends.

Step S6: When the user and the data $W_n$ are both decided as valid, the server begins to offer the requested contents transmission services.

Step S7: The server updates the currently registered data $W_{n-1}$, $W_n$ and $M_{n-1}$ with those Wn, $W_{n+1}$ and $M_n$ in association with the identifier A and increments the value n by one.

In this embodiment, too, when the one-way function E is implemented by the FEAL cryptosystem, the authentication processing can be described by a program of a size of about 0.6 K bytes (0.4 K bytes occupied by FEAL) as is the case with Embodiment 1. This program size will impose substantially no load on communications when the program is described on the Applet.

Embodiment 1 applies the present invention to the e-mail messages forwarding services to enable the user to receive messages addressed to him without being affected by the firewall by temporarily using the environment of an e-mail subscriber of the terminal at a visiting site. In Embodiment 2, the authentication processing using the communication protocol (HTTP) is indicated.

Also, it is possible to combine the two embodiments as described below.

[Embodiment 3]

Figure 8:
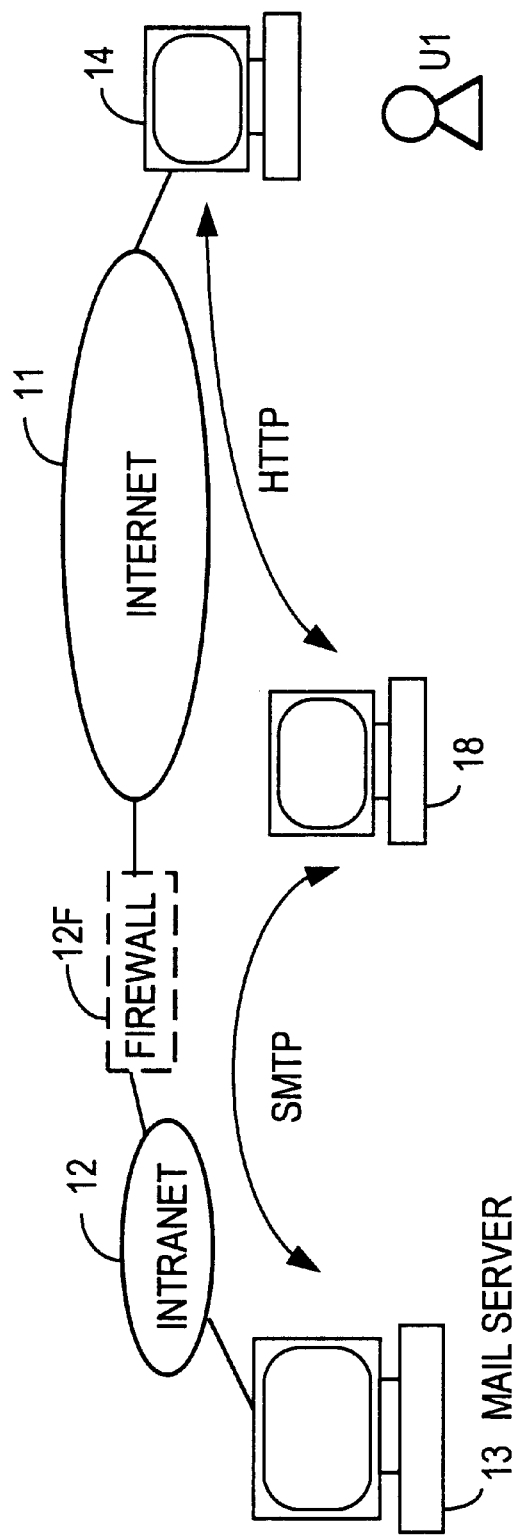
FIG. 8 is a diagram schematically illustrating the system of a third embodiment of the present invention applied to the case of accessing a mail server via a transit server on the Internet.

The Internet is almost always crowded and information cannot smoothly be transmitted or received in many cases. As referred to above with reference to Embodiment 1, the authentication information exchange using the e-mail protocol takes several minutes according to conditions at that time. When it is considered undesirable to keep the user waiting for such a long period of time, a transit server 18 is placed between the user terminal 14 and the mail server 13 as depicted in FIG. 8. In contrast to the mail server 13 that is inside the firewall 12F, that is, on the internal network of the intranet 12, the transit server 18 is assumed to be placed on the Internet 11 and open to the outside. Further, the transit server 18 is assumed to have a user authentication function. The authentication function may be any conventional authentication function, but the following description will be given on the assumption that the authentication processing according to the present invention is performed. In the mail server 13 there are initially registered by the user data n=1, W0, W1 and M0 in association with the user identifier A as in the Embodiment 1 or 2. Letting n' represent the number of authentication sessions between the user and the transit server 18, there are initially registered in the transit server data n'=1, $W_0$, $W_1$ and $M_0$ 18 in association with the user identifier A.

In this embodiment, communications between the terminal 14 connected to the Internet 11 and the mail server 13 connected to the internet 12 are conducted via the transit server 18. In addition, communications between the terminal 14 connected to the Internet 11 and the transit server 18 are carried out using a fast forwarding protocol such as HTTP and communications between the transit server 18 and the mail server 13 employ a-mail protocol such as SMTP.

Figure 9:
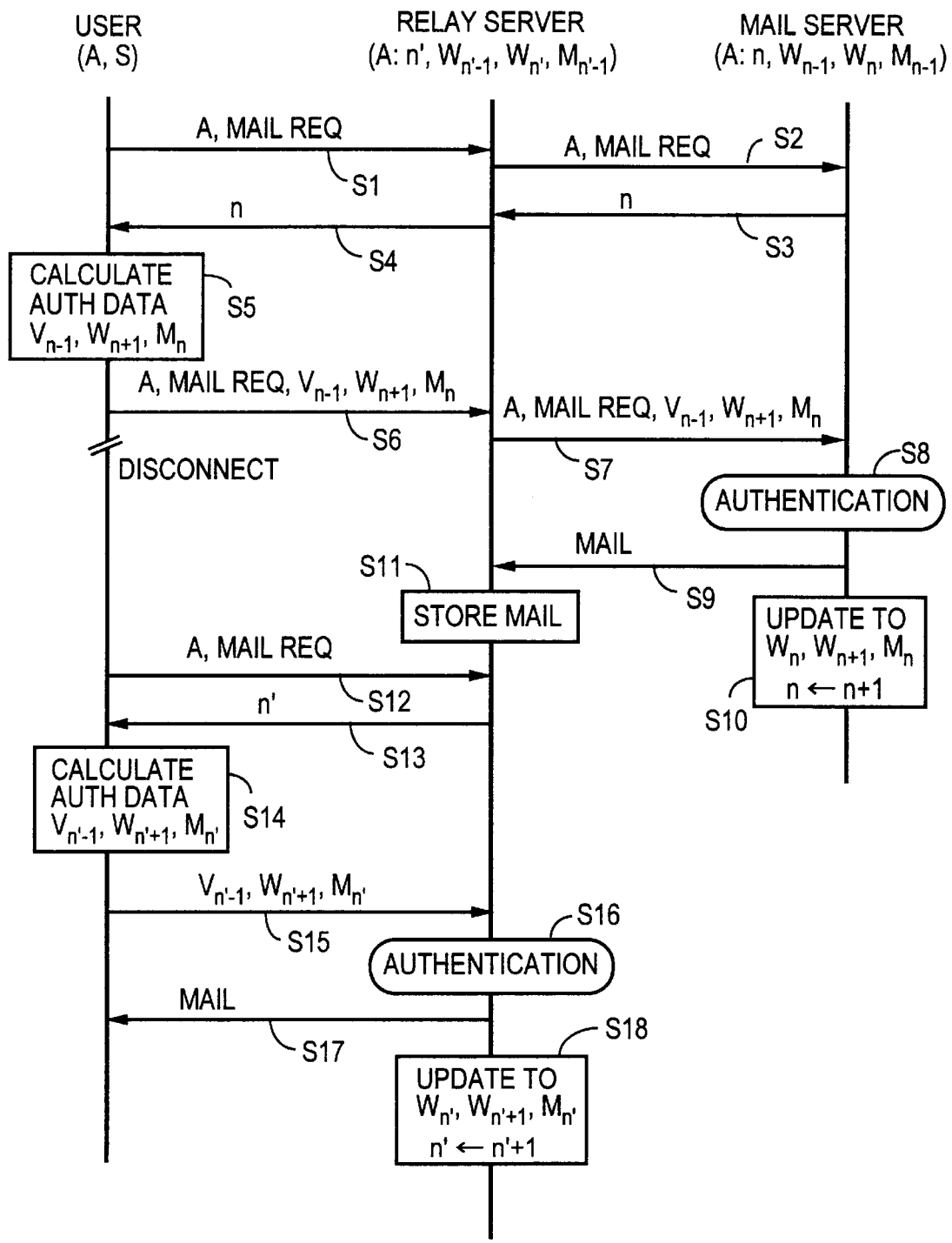
FIG. 9 is a flowchart showing an authentication procedure according to the third embodiment in the system of FIG. 8.

FIG. 9 illustrates a procedure that the user follows in such a system to pick up, via the Internet terminal 14 at a visiting site, an e-mail addressed to him delivered to the mail server 13. At this point, the mail server 13 already has data n, $W_{n-1}$, $W_n$ and $N_{n-1}$ registered in association with the identifier A and the transit server 18 already has data n', $W_{n'-1}$, $W_{n'}$ and $M_{n'-1}$ registered in association with the identifier A.

Step S1: The user sends a mail request and high identifier A to the transit server 18 from the terminal 14 connected to the Internet 11.

Step S2: The transit server 18 sends the received mail request and identifier A by e-mail to the mail server 13.

Step S3: The mail server 13 transmits by e-mail to the transit server 18 the authentication session number n corresponding to the received identifier A.

Step S4: The transit server 18 forwards the authentication session number n to the user.

Step S5: The user uses the received authentication session number n to calculate data for authentication $V_{n-1}$, $W_{n+1}$ and $M_n$ by a procedure similar to that used in step S3 in FIGS. 3 or 7.

Step S6: Further, the user sends these pieces of data for authentication to the transit server 18, together with the identifier A and the mail request. When the mail request is a request for mail transmission, the mail messages to be transmitted are also sent. Then, the user temporarily once breaks off its connection with the transit server 18 and executes other tasks as required.

Step S7: The transit server 18 forwards by e-mail to the mail server 13 the identifier A, mail request (and messages to be transmitted) and the data for authentication $V_{n-1}$, $W_{n+1}$ and $M_n$ received from the user.

Step S8: The mail server 13 reads out the data $W_{n-1}$, $W_n$ and $M_{n-1}$ registered in association with the identifier A and follows the same procedure as in Step S5 in FIGS. 3 or 7 to check the validity of the received data $V_{n-1}$ and the validity of the data $W_n$ for use in the next authentication session n+1. When these pieces of data are decided as valid:

Step S9: The mail server 13 forwards to the transit server 18 mail messages addressed to the user or the identifier A; alternatively, the mail server 13 sends the messages to be transmitted and sends send confirmation information to the transit server 18. Further:

Step S10: The mail server 13 updates the registered data $W_{n-1}$, $W_n$, $M_{n-1}$ with those $W_n$, $W_{n+1}$ and $M_n$ and increments the value n by one.

Step S11: The transit server 18 stores in association with the identifier A the e-mail messages addressed to the identifier A and/or send confirmation information received from the mail server 13.

Step S12: The user breaks off its connection with the transit server 18 and, at a given time after several minutes elapse, sends the identifier A and a mail request to the transit server 18.

Step S13: The transit server 18 reads out the authentication session number n' registered in association with the identifier A and sends it to the user.

Step S14: The user uses the received value n' to compute data for authentication $V_{n'-1}$, $W_{n'+1}$ and $M_{n'}$ by the same procedure as in step S3 in FIGS. 3 or 7.

Step S15: The user sends the thus-computed data to the transit server 18.

Step S16: The transit server uses the received data $W_{n'-}$, $W_{n'+1}$ and $W_{n'}$ to check the validity of the data $V_{n'-1}$ and $W_{n'}$ by the same procedure as in step S5 in FIGS. 3 or 7, thereby deciding that the user raising the mail request is an authorized user.

Step S17: The transit server 18 forwards to the user the e-mail messages stored in correspondence with the identifier A. Further:

Step S18: The transit server 18 updates the registered data $W_{n'-1}$, $W_{n'}$ and $M_{n'-1}$ with those $W_{n'}$, $W_{n'+1}$ and $M_{n'}$ and increments the value n' by one.

In this example, for the sake of brevity, the identifier A and the password S for use in calculating the data for authentication in step S14 are the same as in the authentication processing between the user and the mail server 13, but different passwords S and S' may also be used. In such an instance, the $W_0$, $W_1$ and $M_0$ that are preregistered in the transit server 18 are also computed using the password S'. Alternatively, it is possible that the user uses for the authentication processing between himself and the transit server the same pass word S and identifier A as those used for the authentication processing between the user and the mail server as described below. Letting preopened identifiers of the mail server 13 and the transit server 18 be represented by $A_M$ and $A_R$, respectively, the authentication processing between the user and the mail server 13 uses $A \oplus A_M$ as a substitute for the identifier A in Eqs. (1a)–(1e) for initial registration and Eqs. (2a)–(2e) for verification as in the following equations (1a')–(1e') and (21')–(2e') to make a check to see if $W_{n-1} = E(A \oplus A_M, V_{n-1})$ and if $M_{n-1} = E(W_n, V_{n-1})$ in the authentication step 58 by the mail server 13.

$$V_0 = E(A \oplus A_M, S) \quad (1a')$$

$$W_0 = E(A \oplus A_M, V_0) \quad (1b')$$

$$V_1 = E(A \oplus A_M, S \oplus 1) \quad (1c')$$

$$W_1 = E(A \oplus A_M, V_1) \quad (1d')$$

$$M_0 = E(W_1, V_0) \quad (1E')$$

and $$V_{n-1} = E(A \oplus A_M, S \oplus (n-1)) \quad (2a')$$

$$V_n = E(A \oplus A_M, S \oplus n) \quad (2b')$$

$$V_{n+1} = E(A \oplus A_M, S \oplus (n+1)) \quad (2c')$$

$$W_{n+1} = E(A \oplus A_M, V_{n+1}) \quad (2d')$$

$$M_n = E(W_{n+1}, V_n) \quad (2e')$$

Similarly, the authentication processing between the user and the transit server 18 uses $A(L)A_R$ as the identifier A in Eqs. (1a)–(1e) for initial registration and Eqs. (2a)–(2e) for authentication as in the following equations (1a")–(1e") and (2a")–(2e") to make a check to see if $W_{n'-1} = E(A \oplus A_R, V_{n'-1})$ and $M_{n'-1} = E(W_{n'}, V_{n'1})$ in the authentication step S16 by the transit server 18.

$$V_0 = E(A \oplus A_R, S) \quad (1a'')$$

$$W_0 = E(A \oplus A_R, V_0) \quad (1b'')$$

$$V_1 = E(A \oplus A_R, S \oplus 1) \quad (1c'')$$

$$W_1 = E(A \oplus A_R, V_1) \quad (1d'')$$

$$M_0 = E(W_1, V_0) \quad (1e'')$$

and $$V_{n'-1} = E(A \oplus A_R, S \oplus (n'-1)) \quad (2a'')$$

$$V_{n'} = E(A \oplus A_R, S \oplus n') \quad (2'')$$

$$V_{n'+1} = E(A \oplus A_R, S \oplus (n'+1)) \quad (2c'')$$

$$W_{n'+1} = E(A \oplus A_R, V_{n'+1}) \quad (2d'')$$

$$M_{n'} = E(W_{n'+1}, V_{n'}) \quad (2e'')$$

This method is advantageous because the user is permitted to use the same password S and identifier A for both the authentication processing with the mail server 13 and the authentication processing with the transit server without impairing security.

As described above, according to the embodiment of FIG. 9 after sending the mail request to the transit server 18 in step S6, the user can break off its connection with the transit server 18 to switch to other tasks. The user can pick up his requested mail at the transit server 18 any time after several minutes elapse subsequent to the disconnection from the transit server 18. Hence, there is no need for the user to remain in the wait state while keeping its connection with the transit server 18 until the requested mail is forwarded thereto after the authentication by the mail server 13 (step S8) based on the mail request made in step S6.

Figure 10:
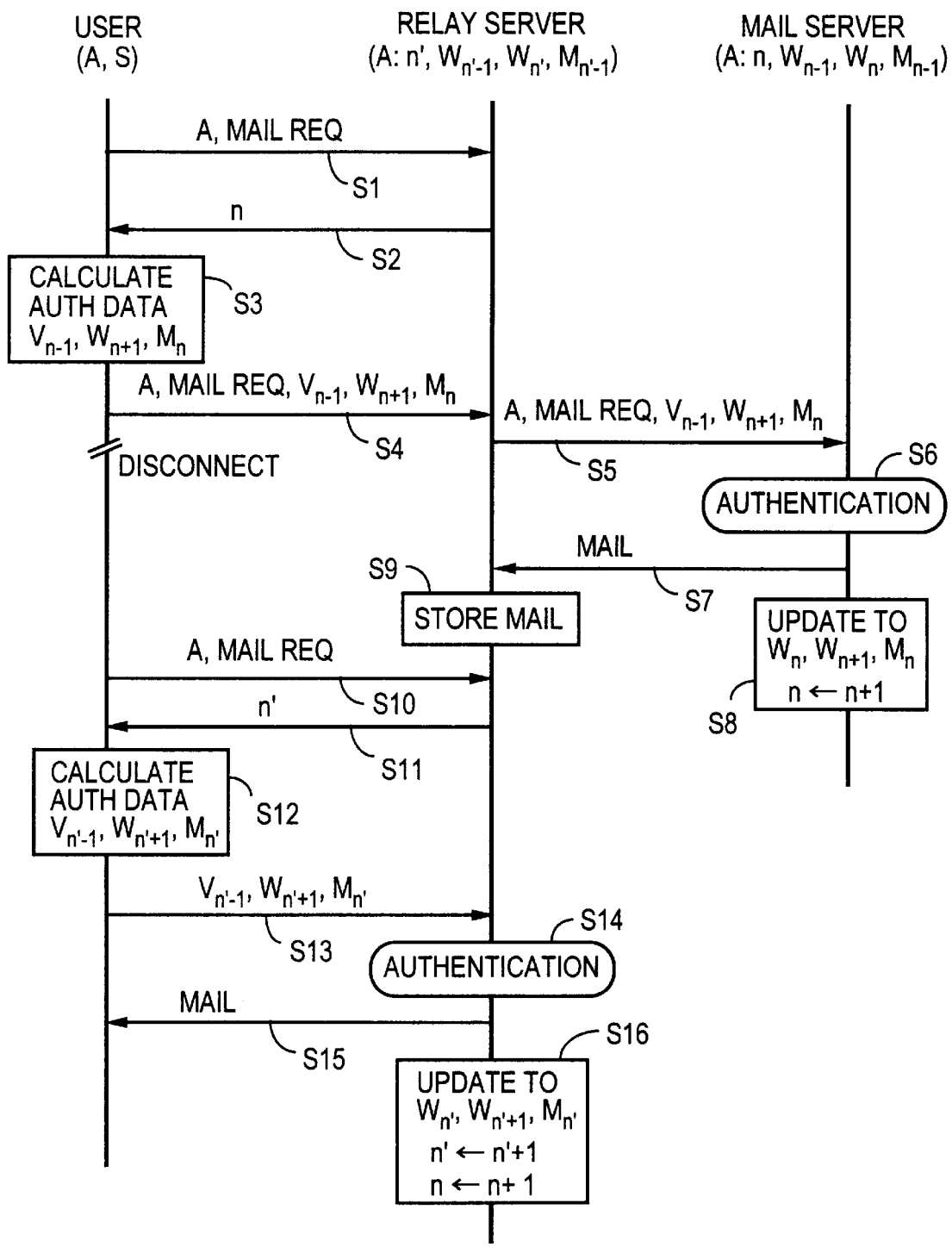
FIG. 10 is a flowchart illustrating a modified form of the third embodiment.

In the FIG. 9 embodiment the number n of the authentication session is provided from the mail server 13 as in the first and second embodiments. In the embodiment of FIG. 9, however, if the transit server 18 has both of the authentication session numbers n and n' in association with the identifier A, steps S2 and S3 could be dispensed with. FIG. 10 shows n-th authentication processing in such an instance.

In the example of FIG. 10, the mail server 13 sends in advance the initial value n=1 of the authentication session number n among the initially registered data to the transit server 18. As is the case with FIG. 9, the transit server 18 has the data n', $W_{n'-1}$, $W_{n'}$, and $M_{n'-1}$ registered in association with the identifier A and the authentication session number n between the user and the mail server 13 also registered in association with the identifier A.

Upon receiving the identifier A and the mail request from the user in step S1, the transit server 18 does not forward the mail request and the identifier A to the mail server 13 but instead in step S2 it immediately sends back to the user the authentication session number n corresponding to the identifier A. The user uses the value n to compute the data for authentication $V_{n-1}$, $W_{n+1}$ and $M_n$ in step S3 and, in step S4, sends these pieces of data for authentication via the transit server 18 to the mail server 13, together with the identifier A and the mail request, after which the user can break off its connection with the transit server 18 to switch the terminal to other tasks. Steps S4 through S15 are exactly the same as those S6 through S17 in FIG. 9. The transit server 18 updates in step S16 the data for authentication $W_{n'-1}$, $W_{n'}$, $M_{n'-1}$ with $W_{n'}$, $W_{n'+1}$ and $M_{n'}$, respectively, and increments each of the authentication session number n' of the transit server 18 and the authentication session number n of the mail server 13 by one. Incidentally, the increment of the authentication session number n may be done any time after receiving from the mail server 13 in step S7 information indicating the authentication of the user.

Also, in the FIG. 10 embodiment it is preferable to use $A \oplus A_M$ in place of the identifier A in the authentication processing between the user and the mail server 13 and $A \oplus A_R$ in the authentication processing between the user and the transit server 13 as described previously with reference to FIG. 9.

As described above, in the embodiments of FIGS. 9 and 10, the user sends the service request and the user identifier A to the transit server 18 to start the authentication procedure and then temporarily breaks off the connection with the transit server 18. The transit server 18 sends the received data for authentication to the mail server 13, that is, verifier equipment, to perform the authentication processing and, if the user is recognized as an authorized user, the transit server 18 has the e-mail forwarded from the mail server 13. After a short time the user again performs the authentication processing between himself and the transit server 18 and can make the latter forward required information.

With such a configuration, a fast-forwarding protocol such as HTTP can be used between the user and the transit server 18 since the transit server 18 is made public. Although, the communications between the transit server 18 and the mail server 13 inside the intranet use the e-mail protocol, despite its lower transfer rate, with a view to evading the firewall, the transfer rate can be increased since the number of hosts through which the communications are conducted is small.

By sharing the authentication session number n by the mail server 13 and the transit server 18 and by performing the updating in synchronism with each authentication so as to realize faster processing, the authentication procedure could be reduced by one stage of information exchange.

Embodiment 4

Figure 11:
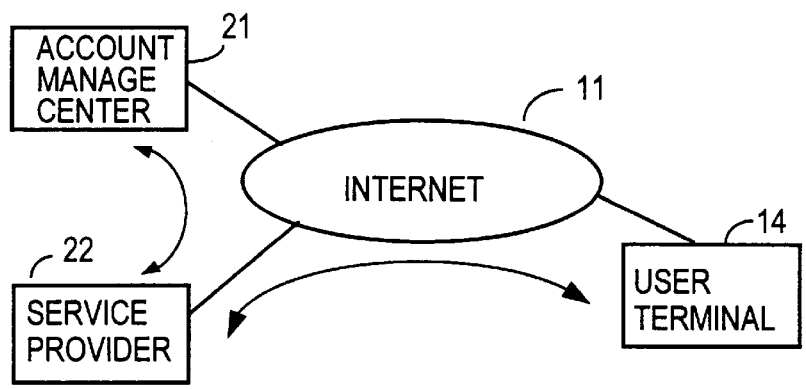
FIG. 11 is a diagram showing a system in which the authentication method of the present invention is applied to Internet shopping.
Figure 12:
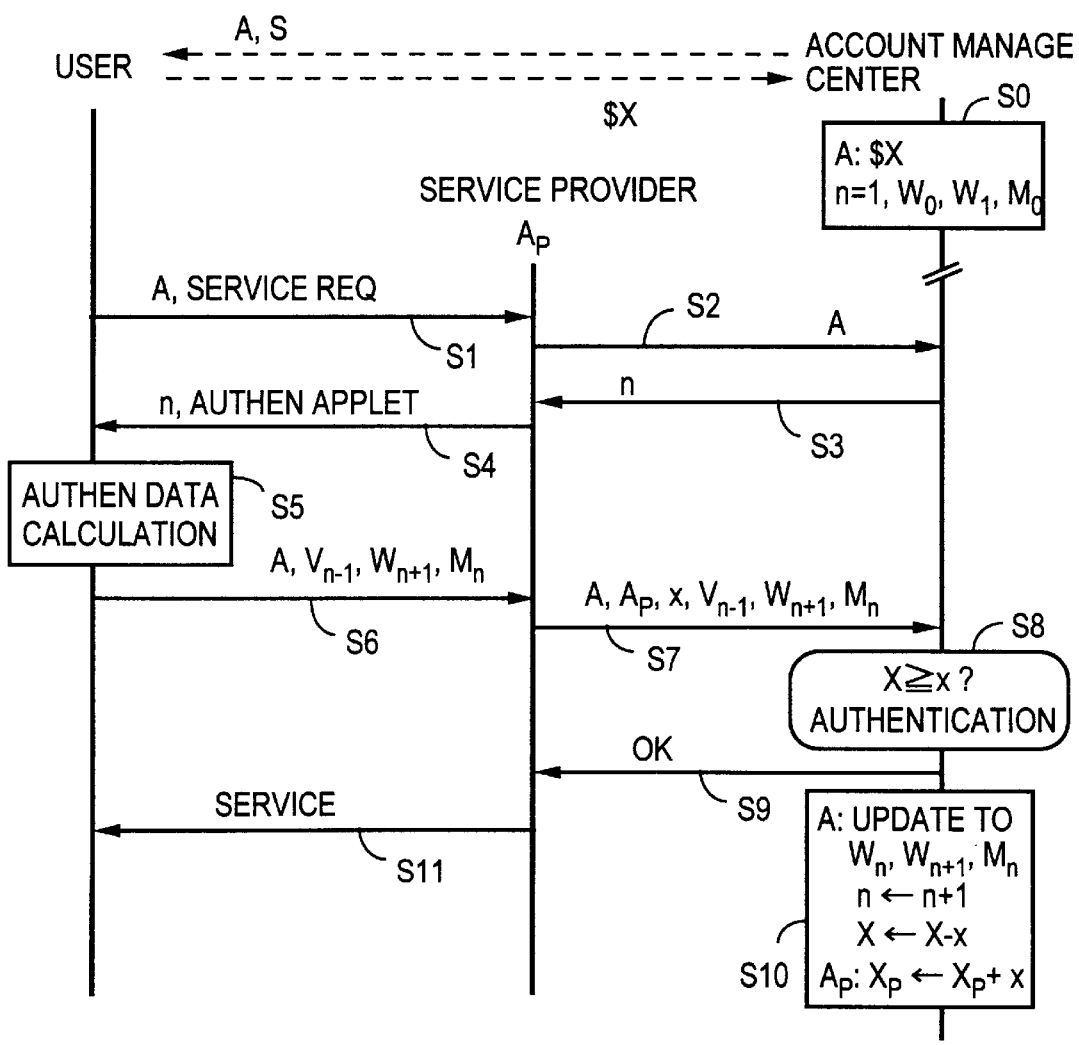
FIG. 12 is a flowchart showing the Internet shopping procedure embodying the authentication method of the present invention.

Next, a description will be given, with reference to FIGS. 11 and 12, of an embodiment that applies the authentication method according to the present invention to a charging system for services on the Internet. It is anticipated that shopping on the Internet will soon become a reality. In conventional Internet shopping it is customary that the user accesses a home page of a service provider on the Internet and pays for a desired commodity or service with a credit card. However, payment with the credit card is not suitable for daily use because the minimum amount of money usable by one payment is relatively large. In addition, the user is required to transmit the number of his credit card to the provider—this gives rise to a security problem.

An unspecified number of users each pay a predetermined amount of money $X in a lump sum into an accounting management center 21 on the Internet 11 through a telephone, for instance, or through Dial Q2 (alternate charge collecting services). Each user is given a different pair of passwords A and account A by mail or by telephone message directly. The user account A corresponds to the user identifier A in the preceding embodiments.

Step S0: The accounting management center 21 holds in a memory (not shown) the amount of money X paid into each account A and initial registered data n=1, $W_0$, $W_1$ and $M_0$ that are used in the authentication procedure according to the present invention.

Step S1: The user gets a service catalog, for example, from a home page of a service provider 22 on the Internet 11 and sends to the service provider 22 a service request signal designating a service desired to be received and the account A.

Step S2: The service provider 22 sends the user account A to the accounting management center 21 to request it to send the corresponding authentication session number n.

Step S3: The accounting management center 21 reads out of the memory the authentication session number n corresponding to the account A and sends it to the service provider 22.

Step S4: The service provider 22 sends the authentication session number n to the user, together with a program of the user's authentication procedure described in Java Applet.

Step S5: The user calculates data for authentication $V_{n-1}$ and $W_{n+1}$ by Eqs. (2a)–(2e) based on the password S, the account A and the authentication session number n, following the authentication procedure, and in step S6 the user sends the data to the service provider 22.

Step S7: The service provider 22 sends the data $V_{n-1}$ and $W_{n+1}$ and the user account A to the accounting management center 21, together with an amount of money x for the service designated by the user and an account $A_p$ of the service provider 22.

Step S8: The accounting management center 21 makes a check to see if the amount of money x to be paid is smaller than the balance X and, if so, checks the validity of the received data $V_{n-1}$ and the validity of the registered data $W_n$; if they are valid, then the center 21 transmits a confirmation signal OK to the provider 22 in step S9.

Step S10: The accounting management center 21 updates the registered data with $W_n$, $W_{n+1}$ and $M_n$, then increments the authentication session number n by one, and updates the balance x of the user with X−x. Further, the center 21 updates the balance $X_p$ of the account $A_p$ of the service provider 22 with $X_p$+x.

Step S11: The service provider 22 responds to the confirmation signal OK from the center 21 to offer the designated service to the user.

By applying the authentication procedure according to the present invention to Internet shopping, payment in a small amount can be made and the settlement of account is secure.

Effect of the Invention

As described above, the authentication procedure by the contents transmission control method of the present invention avoids the necessity of providing a read/write mechanism for an IC card or similar storage means and a random number generating mechanism at the prover's side and enables the authentication processing with a small program size. Hence, the present invention makes it possible to offer secure information storage and retrieval services even to terminals of limited processing ability such as Internet home appliances.

It will be apparent that many modifications and variations may be effected without departing from the scope of the novel concepts of the present invention.

What is claimed is:

1. A contents transmission control method for performing authentication processing between user terminal equipment that a user uses on a network and verifier's equipment, said method comprising the steps;

(a) wherein, as an initial registration procedure, said user terminal equipment computes, from a user identifier A and a password S held in secrecy, data $W_0$ for use in the next authentication session, data $W_1$ for use in the authentication session after the next authentication session and data $M_0$ for checking the validity of said data $W_1$ and registers them in said verifier equipment, together with an initial value of the authentication session number n in association with said user identifier A;

(b) wherein, letting n be a positive integer, said verifier equipment receives, in an n-th authentication session, a service request and said user identifier A from said user terminal equipment, then reads out the authentication session number n of said user, and sends said number n to said user terminal equipment;

(c) wherein said user terminal equipment uses said user identifier A, said authentication session number n sent from said verifier equipment and said password S held in secrecy to compute data $V_{n-1}$ to be authenticated in the current authentication session, data $W_{n+1}$ for use in the authentication session after the next authentication session and data $M_n$ for checking the validity of said data $W_{n+1}$ and sends said computed data to said verifier equipment, together with contents data desired to transmit, if any;

(d) wherein said verifier equipment compares data $W_{n-1}$ for use in the current authentication session, computed from said user identifier A and said data $V_{n-1}$ sent from said user terminal equipment in said step (c) with already registered authenticated data $W_{n-1}$, and further compares validity verification data $M_{n-1}$ computed from registered data $W_n$ for use in the next authentication session and said data $V_{n-1}$ to be authenticated in said current authentication session, with already registered validity verification data $M_{n-1}$;

(e) wherein when said data compared in said step (d) agree, said verifier equipment accepts said user as valid, then transmits and receives information of the service requested by said user, then updates previously registered data $W_{n-1}$, $W_n$ and $M_{n-1}$ with said data $W_n$ received in the previous authentication session and for use in the next authentication sessions said data $W_{n+1}$ for use in the authentication session after the next authentication session and said validity verification data $M_n$ for said data $W_{n+1}$ sent from said user terminal equipment in the current authentication session, and said verifier equipment increments said authentication session number n by one; and (f) wherein if said data compared in said step (d) do not agree, said verifier equipment decides said user is invalid and rejects contents transmission thereafter and holds unchanged said data $W_{n-1}$, $M_n$, $M_{n-1}$ and n registered in the previous authentication session.

2. The method of claim 1, wherein said user terminal equipment executes said initial registration procedure of said step (a) in said verifier equipment.

3. The method of claim 1, wherein an e-mail protocol is used for data transmission between said user terminal equipment and said verifier equipment, contents data of communication processing is sent as an e-mail to said user, e-mail information of said user in said verifier equipment is forwarded to said user terminal equipment at a remote location, or an e-mail is sent from a remote location using a mail address of said user.

4. The method of claim 1, wherein said user terminal equipment generates said data $W_0$, $W_1$ and $M_1$ $M_0$ and sends them to said verifier equipment, together with said initial value of said authentication session number n, thereby execute said initial registration procedure in said step (a).

5. The method of claim 1, wherein said verifier equipment sends to said user terminal equipment, in said step (b), a communication unit of a program that describes said user's authentication procedure in said step (c) in a particular communication unit by a predetermined method and, in said step (c), said user terminal equipment executes said communication unit program sent from said verifier unit, thereby performing said authentication procedure.

6. The method of claim 4, wherein said verifier equipment responds to a user's request, prior to said step (a), to sends thereto a communication unit of a program that describes said initial registration procedure in said step (a) in a particular communication unit by a predetermined method and, in said step (a), said user terminal equipment executes said communication unit program sent from said verifier unit, thereby performing said initial registration procedure.

7. The method of claim 1 or 4, wherein, said initial value of n is one and letting E represent a one-way function, said step (a) follows the procedure $V_0 = E(A, S)$ $W_0 = E(A, V_0)$ $V_1 = E(A, S \oplus 1)$ $W_1 = E(A, V_1)$ $M_0 = E(W_1, V_0)$ to compute said initial data values $W_0$, $W_1$ and $M_0$, said step (c) follows the procedure $V_{n-1} = E(A, S \oplus (n-1))$ $V_n = E(A, S \oplus n)$ $V_{n+1} = E(A, S \oplus (n+1))$ $W_{n+1} = E(A, V_{n+1})$ $M_n = E(W_{n+1}, V_n)$ to compute said data $V_{n-1}$, $W_{n+1}$ and $M_n$ and said step (d) calculates $E(A, V_{n-1})$ and $E(W_n, V_{n-1})$ from said data $V_{n-1}$ received from said user and said registered data A and $W_n$ and makes a check to see if they agree with registered data $W_{n-1}$ and $M_{n-1}$, respectively.

8. The method of claim 1, wherein: said network contains the Internet to which said user terminal equipment is connected and an intranet connected to said Internet, said verifier equipment is connected to said intranet, an opened transit server is connected to said Internet, said user terminal equipment and said transit server use fast communication protocol for transmission therebetween, and said transit server and said verifier equipment use an e-mail protocol for transmission therebetween so that the transmission of authentication information between said user terminal equipment and said verifier equipment is carried out via said transit server.

9. The method of claim 8, wherein: said user terminal equipment sends said data $V_{n-1}$, $W_{n+1}$ and $m_n$ in said step (c) and then temporarily breaks off its connection with said transit server; upon completion of authentication in said step (e), said verifier equipment forwards to said transit server the information of the service requested by said user, said service information being stored in said transit server; and at a given time after a certain elapsed time subsequent to its disconnection from said transit server said user terminal equipment makes its connection with said transit server again and performs between said user terminal equipment and said transit server authentication processing for checking the validity of said user, thereafter receiving said service information.

10. A contents transmission control method for performing authentication processing between user terminal equipment and verifier equipment in a system wherein said user terminal equipment and a transit server are connected to the Internet and said verifier equipment is connected to an intranet connected to said Internet so that contents transmission between said user terminal equipment and said verifier equipment is made via said transit server, said method comprising the steps:

(a) wherein said user terminal equipment computes from a user identifier A and a password S held in secrecy data $W_0$ for use in the next authentication session, data $W_1$ for use in the authentication session after the next authentication session and data $M_0$ for checking the validity of said data $W_1$, then registers said three pieces of data in said verifier equipment in association with said user identifier A, and the initial value of the authentication session number n in said verifier equipment and said transit server in association with said user identifier A;

(b) wherein, letting n be a positive integer, said transit server receives, in an n-th authentication, a service request and said user identifier A from said user terminal equipment, then reads out said authentication session number n, and sends said number n to said user terminal equipment;

(c) wherein said user terminal equipment uses said user identifier A, said authentication session number n sent from said verifier equipment and said password S held in secrecy to compute data $V_{n-1}$ to be authenticated in the current authentication session, data $W_{n+1}$ for use in the authentication session after the next and data $M_n$ for checking the validity of data $W_{n+1}$ and said user terminal equipment sends said three computed pieces of data via said transit server to said verifier equipment together with contents data desired to transmit, if any, and thereafter temporarily breaks off its connection with said transit server;

(d) wherein said verifier equipment computes said data $W_{n-1}$ for use in the current authentication session from said user identifier A and said data $V_{n-1}$ sent from said user terminal equipment in said step (c), then compares said computed data $W_{n-1}$ with already registered authenticated data $W_{n-1}$, and further compares validity verification data $M_{n-1}$, computed from registered data $W_n$ for use in the next authentication session and said data $V_{n-1}$ to be authenticated in the current authentication session, with already registered validity verification data $M_{n-1}$;

(e) wherein when said pieces of data compared in said step (d) agree, said verifier equipment accepts said user as valid, then forwards information of the service requested by said user to said transit server and stores therein said information, of the service or if said verifier equipment has contents information desired to transmit, said verifier equipment transmits said contents information in the capacity of a certified user and sends to said transit server confirmation information indicating completion of the transmission;

(f) wherein said verifier equipment further updates previously registered data $W_{n-1}$, $W_n$ and $M_{n-1}$ with said data $W_n$ received in the previous authentication session and for use in the next authentication session and said data $W_{n+1}$ for use in the authentication session after the next authentication session and said data $M_n$ for validity checking of said data $W_{n+1}$ sent from said user terminal equipment in the current authentication session, and said verifier equipment increments said authentication session number n by one, and if said pieces of data compared in said step (d) do not agree, said verifier equipment decides said user is invalid and rejects contents transmission thereafter and holds intact data $W_{n-1}$, $W_n$, $M_n$ and n registered in the previous authentication session;

(g) wherein said transit server receives said service information or transmission confirmation information and then increments said authentication session number n by one; and (h) wherein said user terminal equipment makes its connection with said transit server again at a given time after a certain lapse of time subsequent to its disconnection from said transit server, then performs in cooperation therewith authentication processing for checking the validity of said user with respect to said service information, and receives said service information.

11. The method of claims 9 or 10, wherein, said initial value of said session number n is one and letting E represent a one-way function, an identifier of said verifier equipment be represented by $A_M$, said three pieces of data $W_0$, $W_1$ and $M_0$ for said initial registration are computed in said step (a) by the following procedure $V_0 = E(A \oplus A_M, S)$ $W_0 = E(A \oplus A_M, V_0)$ $V_1 = E(A \oplus A_M, S \oplus 1)$ $W_1 = E(A \oplus A_M, V_1)$ $M_0 = E(W_1, V_0)$ and said user terminal equipment computes said data $V_{n-1}$, $W_{n+1}$ and $M_n$ for use in an n-th authentication session by the following procedure $V_{n-1} = E(A \oplus A_M, S \oplus (n-1))$ $V_n = E(A \oplus A_M, S \oplus n)$ $V_{n+1} = E(A \oplus A_M, S \oplus (n+1))$ $W_{n+1} 32 E(A \oplus A_M, V_{n+1})$ $M_n = E(W_{n+1}, V_n)$ and said verifier equipment performs said comparison processing by making a check to see if $W_{n-1} = E(W_n, V_{n-1})$ and if $M_{n-1} = E(W_n, V_n)$.

12. The method of claim 11, wherein, letting the number of authentication session between said user terminal equipment and said transit server be represented by n' and authentication between said user and said transit server comprising the steps:

(a') wherein, as an initial registration procedure, said user terminal equipment computes, using a one-way function E, from said user identifier A and a password S held in secrecy data $W_0$, for use in the next authentication session, data $W_1$, for use in the authentication session after the next authentication session and data $M_0$, for checking the validity of said data W1' and registers them in said transit server, together with an initial value of said authentication session number n' in association with said user identifier A;

(b') wherein, letting n' be a positive integer, said transit server receives, in an n'-th authentication session, a service request and said user identifier A from said user terminal equipment, then reads out the authentication session number n' of said user, and sends said number n' to said user terminal equipment;

(c') wherein said user terminal equipment uses said user identifier A, said authentication session number n' sent from said transit server and said password S held in secrecy to compute data $V_{n'-1}$ to be authenticated in the current-authentication session, data $W_{n'+1}$ for use in the authentication session after the next authentication session and data $M_{n'}$, for checking the validity of said data $W_{n'+1}$;

(d') wherein said transit server compares data $W_{n'-1}$ for use in the current authentication session, computed from said user identifier A and said data $V_{n'-1}$ sent from said user terminal equipment in said step (c') with already registered authenticated data $W_{n'-1}$, and further compares validity verification data $M_{n'-1}$, computed from registered data $W_{n'}$, for use in the next authentication session and said data $V_{n'-1}$ to be authenticated in said current authentication session, with already registered validity verification data $M_{n'-1}$;

(e') wherein when said data compared in said step (d') agree, said transit server accepts said user as valid, then transmits and receives information of the service requested by said user, then updates previously registered data $W_{n'-1}$ $W_{n'}$, and $M_{n'-1}$ with said data $W_n$ received in the previous authentication session and for use in the next authentication session and said data $W_{n'+1}$ for use in the authentication session after the next authentication session and said validity verification data $M_{n'}$ for said data $W_{n'+}$ sent from said user terminal equipment in the current authentication session, and said transit server increments said authentication session number n' by one.

13. The method of claim 12, wherein letting an identifier of said transit server be represented by $A_R$, said step (a') computes said data $W_0$, $W_1$, and $M_0$, by the following procedure $V_{0'}=E(A\oplus A_R, S)$ $W_{0'}=E(A\oplus A_R, V_{0'})$ $V_{1'}=E(A\oplus A_R, S\oplus 1)$ $W_{1'}=E(A\oplus A_R, V_{1'})$ $M_{0'}=E(W_{1'}, V_{0'})$ and said step (b') computes said data $V_{n'-1}$, $W_{n'+1}$ and $M_{n'}$ by the following procedure $V_{n'-1}=E(A\oplus A_R, S\oplus(n'-1))$ $V_{n'}=E(A\oplus A_R, S\oplus n')$ $V_{n'+1}=E(A\oplus A_R, S\oplus(n'+1))$ $W_{n'+1}=E(A\oplus A_R, V_{n'+1})$ $M_{n'}=E(W_{n'+1}, V_{n'})$ and said step (d') compares said data $W_{n'-1}=E(A\oplus A_R, V_{n'-1})$ for use in the current authentication session with said registered data $W_{n'-1}$ and compares validity verification data $M_{n'+1}=E(W_{n'}, V_{n'-1})$, computed from registered data $W_{n'}$ for use in the next authentication session and said data $V_{n'-1}$ to be authenticated in the current authentication session, with registered validity verification data $M_{n'-1}$.

14. A contents control method by which a user terminal equipment performs authentication processing between said user and verifier equipment in the case where user terminal equipment, a service provider and said verifier equipment are connected to the Internet and said user receives services from said service provider on said Internet, said method comprising the steps:

(a) wherein said user terminal equipment computes from a user account A and password S data $W_0$ for use in the next authentication session, data $W_1$ for use in the authentication session after the next authentication session and data $M_0$ for checking the validity of said data $W_1$ and registers them, together with an initial value of the authentication session number n and an amount of money X, in an accounting management center in association with said user account A;

(b) wherein said user terminal equipment sends to said service provider a service request signal requesting a desired service and said account A;

(c) wherein said service provider transfers said received account A to said accounting management center;

(d) wherein said accounting management center reads out the authentication session number n corresponding to said account A and sends it to said service provider;

(e) wherein said service provider sends said received authentication session number n to said user terminal equipment together with an Applet program of an authentication procedure;

(f) wherein said user terminal equipment follows said authentication procedure to calculate authentication data $V_{n-1}$, $W_{n+1}$ and $M_n$ and send them to said service provider, together with said account A;

(g) wherein said service provider sends to said accounting management center said data $V_{n-1}$, $W_{n+1}$, and $M_n$, together with an account $A_p$ of said service provider and the amount of money x charged for said service;

(h) wherein said accounting management center makes sure that said amount of money x is smaller than the balance X registered in association with said account A, then verifies said received data $V_{n-1}$ and said registered data $W_n$ for use in the next authentication session, and if they are both correct, sends an authentication confirm signal OK to said service provider, while at the same time said verifier equipment updates said previously registered data $W_{n-1}$, $W_n$ and $M_{n-1}$ with those $W_n$, $W_{n+1}$ and $M_n$, then increments said authentication session number n by one, and updates said balance X of said account A with X−x and the balance $X_p$ of said provider's account $A_p$ with $X_p+x$; and (i) wherein upon receiving said confirm signal OK, said service provider offers the designated service to said user.

15. Verifier equipment which effects contents transmission control for authenticating the validity of a user on a network, said equipment comprising:

registered data storage means wherein, letting n be a positive integer, data $W_{n-1}$ for use in the next authentication session, data $W_n$ for use in the authentication session after the next authentication session and data $M_{n-1}$ for checking the validity of said data $W_n$ are registered, together with the authentication session number n, in association with a user identifier A in an (n−1)th authentication session;

authentication session number sending means which, in an n-th authentication session, receives a service request and said user identifier A from terminal equipment of said user, then reads out said authentication session number n of said user from said registered data storage means, and sends said read-out authentication session number n to said user terminal equipment;

receiving means for receiving from said user terminal equipment data $V_{n-1}$ to be authenticated in the current authentication session, data $W_{n+1}$ for use in the authentication session after the next authentication session and data $M_n$ for checking the validity of said data $W_{n+1}$;

authentication means for comparing data $W_{n-1}$ for use in the current authentication session, computed from said user identifier A and said received data $V_{n-1}$ to be authenticated in the current session, with said data $W_{n-1}$ registered in said registered data storage means and for comparing validity check data $M_{n-1}$ computed from said registered data $W_n$ for use in the next authentication session and said data $V_{n-1}$ to be authenticated in the current session, with said registered validity check data $M_{n-1}$; and registration update means which, when said data compared by said authentication means agree, accepts said user as valid, then updates said data $W_{n-1}$, $W_n$ and $M_{n-1}$ registered in said registered data storage means with said registered data $W_n$ for use in the next authentication session, said currently received data $W_{n+1}$ for use in the authentication session after the next authentication session and the data $M_n$ for checking the validity of said data $W_{n+1}$, and increments said authentication session number n by one.

16. The equipment of claim 15, wherein said authentication means includes means for calculating one-way functions $E(A, V_{n-1})$ and $E(W_n, V_{n-1})$ from said data $V_{n-1}$ received from said user and said registered data A and $W_n$ and for deciding whether they agree with said registered data $W_{n-1}$ and $M_{n-1}$, respectively.

17. User terminal equipment that effects contents-transmission control for getting authentication of a user from a verifier on a network, said terminal equipment comprising:

authentication session number receiving means for receiving the authentication session number n from verifier equipment;

authentication data calculating means for calculating, as data for authentication, data $V_{n-1}$ to be authenticated in the current authentication session, data $W_{n+1}$ for use in the authentication session after the next authentication session and data $M_n$ for checking the validity of said data $W_{n+1}$ from an identifier A of said user, said received authentication session number n and a password S held in secrecy; and authentication data transmitting means for transmitting said data for authentication to said verifier equipment.

18. The terminal equipment of claim 17, wherein said authentication data calculating means is means for calculating said data $V_{n-1}$, $W_{n+1}$ and $M_n$ by using the following one-way functions:

$$V_{n-1}=E(A, S \oplus (n-1))$$

$$V_n=E(A, S \oplus n)$$

$$V_{n+1}=E(A, S \oplus (n+1))$$

$$W_{n+1}=E(A, V_{n+1})$$

$$M_n=E(W_{n+1}, V_n).$$

19. A recording medium which has recorded thereon a verifier's authentication procedure for authenticating the validity of a user on a network, said authentication procedure comprising the steps of:

(a) wherein said verifier computes initial data values $W_0$, $W_1$ and $M_0$ by the following one-way functions using an identifier A and password S of said user and registers said values in registered data storage means:

$$V_0=E(A, S)$$

$$W_0=E(A, V_0)$$

$$V_1=E(A, S \oplus 1)$$

$$W_1=E(A, V_1)$$

$$M_0=E(W_1, V_0)$$

(b) wherein, letting n be a positive integer, said verifier equipment receives in an n-th authentication session a service request and said user identifier A from terminal equipment of said user, then reads out the authentication session number n from said registered data storage means and sends it to said user terminal equipment;

(c) said verifier equipment receives from said user terminal equipment data $V_{n-1}$ to be authenticated in the current authentication session, data $W_{n+1}$ for use in the authentication session after the next autentication session and data $M_n$ for checking the validity of said data $W_{n+1}$;

(d) wherein said verifier computes, by a one-way function $W_{n-1}=E(A, V_{n-1})$, said data $W_{n-1}$, for use in the current authentication session from said user identifier A and said received data $V_{n-1}$ to be authenticated in the current authentication session, then compares said computed data $W_{n-1}$ with authenticated data $W_{n-1}$ registered in said registered data storage means, then computes, by a one-way function $M_{n-1}=E(W_n, V_{n-1})$, validity check data $M_{n-1}$ from said registered data $W_n$ for use in the next authentication session, and compares said computed data $M_{n-1}$ with registered validity check data $M_{n-1}$;

(e) wherein when said pairs of data compared in said step (d) agree at the same time, said verifier equipment accepts said user as valid, then updates said data $W_{n-1}$, $W_n$ and $M_{n-1}$ registered in said registered data storage means with said registered data $W_n$ for use in the next authentication session, the currently received data $W_{n+1}$ for use in the authentication session after the next and the data $M_n$ for checking the validity of said data $W_{n+1}$ and said verifier equipment increments said authentication session number n by one.

20. A recording medium which has recorded thereon a procedure for authenticating a user by a verifier on a network, said procedure comprising the steps of:

(a) sending a service request and a user identifier A to equipment of said verifier;

(b) receiving the authentication session number n from said verifier equipment, n being a positive integer;

(c) computing data $V_{n-1}$ to be authenticated in the current authentication session, data $W_{n+1}$ for use in the authentication session after the next authentication session and data $M_n$ for checking the validity of said data $W_{n+1}$ from said user identifier A, said received authentication session number n and a user's password held in secrecy by the following one way functions;

$$V_{n-1}=E(A, S \oplus (n-1))$$

$$V_n=E(A, S \oplus n)$$

$$V_{n+1}=E(A, S \oplus (n+1))$$

$$W_{n+1}=E(A, V_{n+1})$$

$$M_n=E(W_{n+1}, V_n)$$

and sends said computed data to said verifier equipment.

* * * * *